United States Patent
Na

(10) Patent No.: US 10,422,500 B2
(45) Date of Patent: *Sep. 24, 2019

(54) LAMP FOR VEHICLE AND METHOD FOR CONTROLLING THE SAME

(71) Applicant: LG Electronics Inc., Seoul (KR)

(72) Inventor: Taeyoung Na, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/816,715

(22) Filed: Nov. 17, 2017

(65) Prior Publication Data
US 2018/0180243 A1 Jun. 28, 2018

(30) Foreign Application Priority Data

Dec. 27, 2016 (KR) .......................... 10-2016-0180426

(51) Int. Cl.
*F21S 41/68* (2018.01)
*F21S 41/20* (2018.01)
(Continued)

(52) U.S. Cl.
CPC ................ *F21S 41/68* (2018.01); *B60Q 1/02* (2013.01); *B60Q 1/143* (2013.01); *F21S 41/143* (2018.01); *F21S 41/145* (2018.01); *F21S 41/148* (2018.01); *F21S 41/16* (2018.01); *F21S 41/162* (2018.01); *F21S 41/255* (2018.01); *F21S 41/285* (2018.01); *F21S 41/36* (2018.01); *F21S 41/40* (2018.01); *F21S 41/645* (2018.01); *F21S 41/689* (2018.01); *F21S 41/698* (2018.01); *F21S 43/26* (2018.01); *F21S 43/31* (2018.01); *B60Q 1/0047* (2013.01); *B60Q 1/20* (2013.01); *B60Q 1/30* (2013.01); *B60Q 1/32* (2013.01);
(Continued)

(58) Field of Classification Search
None
See application file for complete search history.

(56) References Cited

U.S. PATENT DOCUMENTS

| 4,985,816 | A | 1/1991 | Seko et al. |
| 5,161,875 | A | 11/1992 | Sekiguchi et al. |
| 2014/0268837 | A1 | 9/2014 | Simchak et al. |

FOREIGN PATENT DOCUMENTS

| DE | 102013020549 A1 | 6/2015 |
| EP | 3043108 A1 | 7/2016 |

(Continued)

OTHER PUBLICATIONS

European Extended Search Report in European Application No. 17210171.9, dated May 7, 2018, 9 pages.

*Primary Examiner* — Kristy A Haupt
(74) *Attorney, Agent, or Firm* — Fish & Richardson P.C.

(57) ABSTRACT

A vehicle lamp includes: a light source unit including at least one light source configured to generate light; a lens that is arranged closer to a front of the vehicle lamp as compared to the light source unit, the lens configured to transmit the light generated by the light source unit; and a shield that is arranged between the light source unit and the lens, and configured to receive the light generated by the light source and allow at least a portion of the received light to pass therethrough, wherein the shield includes a plurality of pixels having respective light transmittances that are configured to be variably controlled, and wherein each of the plurality of pixels is configured to allow independent control of respective light transmittances.

18 Claims, 29 Drawing Sheets

(51) Int. Cl.
    *F21S 43/20*    (2018.01)
    *B60Q 1/02*    (2006.01)
    *F21S 41/143*    (2018.01)
    *F21S 41/16*    (2018.01)
    *G01S 17/93*    (2006.01)
    *B60Q 1/20*    (2006.01)
    *B60Q 1/30*    (2006.01)
    *F21S 41/36*    (2018.01)
    *F21S 43/31*    (2018.01)
    *F21S 41/40*    (2018.01)
    *B60Q 1/14*    (2006.01)
    *F21S 41/162*    (2018.01)
    *F21S 41/255*    (2018.01)
    *F21S 41/64*    (2018.01)
    *F21S 41/689*    (2018.01)
    *F21S 41/698*    (2018.01)
    *F21S 41/148*    (2018.01)
    *F21S 41/145*    (2018.01)
    *B60Q 1/34*    (2006.01)
    *B60Q 1/32*    (2006.01)
    *B60Q 1/44*    (2006.01)
    *B60Q 1/00*    (2006.01)
    *G01S 13/93*    (2006.01)
    *G01S 15/93*    (2006.01)
    *F21W 102/14*    (2018.01)
    *F21W 102/13*    (2018.01)

(52) U.S. Cl.
    CPC .................. *B60Q 1/34* (2013.01); *B60Q 1/44* (2013.01); *B60Q 2300/054* (2013.01); *B60Q 2300/132* (2013.01); *B60Q 2300/14* (2013.01); *B60Q 2300/21* (2013.01); *B60Q 2300/314* (2013.01); *B60Q 2300/334* (2013.01); *B60Q 2300/42* (2013.01); *B60Q 2300/45* (2013.01); *F21W 2102/13* (2018.01); *F21W 2102/14* (2018.01); *G01S 13/931* (2013.01); *G01S 15/931* (2013.01); *G01S 17/936* (2013.01)

(56) References Cited

FOREIGN PATENT DOCUMENTS

| | | |
|---|---|---|
| JP | H06191346 A | 7/1994 |
| JP | 11053923 A | 2/1999 |
| JP | 2004231178 A | 8/2004 |
| JP | 2013097885 A1 | 5/2013 |
| JP | 2013196957 A | 9/2013 |

[LHD mode-Light]

[RHD mode-Light]

[ADB mode]

[ADB + Detecting mode]

[Down Aiming & Detecting]

[Up Aiming & Detecting]

LAMP FOR VEHICLE AND METHOD FOR CONTROLLING THE SAME

CROSS-REFERENCE TO RELATED APPLICATION

Pursuant to 35 U.S.C. § 119(a), this application claims an earlier filing date of and right of priority to Korean Application No. 10-2016-0180426, filed on Dec. 27, 2016, the contents of which are incorporated herein by reference in its entirety.

TECHNICAL FIELD

This present disclosure relates to a vehicle lamp and a method of controlling the same.

BACKGROUND

A vehicle is an apparatus configured to move a user in the user's desired direction. A representative example of a vehicle may be an automobile.

A vehicle may be provided with various types of lamps. In general, the vehicle includes various vehicle lamps to provide illumination of object near the vehicle, and to notify a driving state of the vehicle to other vehicles or pedestrians.

Example of the various types of lamp include a head lamp outputting light to a front side to facilitate outward visibility of a driver, a brake lamp for indicating application of a brake, and turn indicator lamps for indicating direction of a turn.

Various types of sensors and electronic devices may be provided in the vehicle to enhance user convenience. For example, an Advanced Driver Assistance System (ADAS) is being actively developed for enhancing the user's driving convenience and safety. In addition, autonomous vehicles are being actively developed. As part of this effort, lamps for vehicle configured to output light in various ways reflecting as part of the ADAS are being actively developed.

SUMMARY

In one aspect, a vehicle lamp includes: a light source unit including at least one light source configured to generate light; a lens that is arranged closer to a front of the vehicle lamp as compared to the light source unit, the lens configured to transmit the light generated by the light source unit; and a shield that is arranged between the light source unit and the lens, and configured to receive the light generated by the light source and allow at least a portion of the received light to pass therethrough, wherein the shield includes a plurality of pixels having respective light transmittances that are configured to be variably controlled, and wherein each of the plurality of pixels is configured to allow independent control of respective light transmittances.

Implementations may include one or more of the following features. For example, the plurality of pixels are arranged on the shield in a matrix form.

In some implementations, each of the plurality of pixels of the shield is configured to provide a variably controlled amount of light transmittance therethrough.

In some implementations, for each pixel, a light transmittance of a first sub portion of the pixel is controllable to be different from a second sub portion of the pixel.

In some implementations, the vehicle lamp further includes at least one processor configured to control a light transmittance of the shield. In some implementations, the at least one processor is configured to: control a portion of the plurality of pixels of the shield to selectively block light from passing therethrough to form a beam pattern having a cut-off line.

In some implementations, the at least one processor is configured to: determine whether the light received by the shield is a direct light or a reflected light; and based on a result of the determination of whether the light received by the shield is a direct light or a reflected light, control a portion of the plurality of pixels of the shield to selectively block light from passing therethrough.

In some implementations, the at least one processor is configured to: based on a determination that the light received by the shield is a reflected light, control the pixels of a first portion of the plurality of pixels to selectively block light from passing therethrough; and based on a determination that the light received by the shield is a direct light, control the pixels of a second portion different from the first portion of the plurality of pixels to selectively block light from passing therethrough.

In some implementations, the plurality of pixels of the shield are configured to form at least one high light transmittance region, at least one low light transmittance region, and at least one adjacent region adjacent to both the high light transmittance region and the low light transmittance region, and the at least one processor is configured to set a light transmittance of the at least one adjacent region to a preset light transmittance.

In some implementations, the vehicle lamp further includes: a sensing unit configured to sense information related to a vehicle including the vehicle lamp, and the at least one processor is configured to set the light transmittance of the at least one adjacent region to the preset light transmittance by: determining that the sensed information related to the vehicle satisfies a preset condition; and based on a determination that the sensed information related to the vehicle satisfies the preset condition, setting the light transmittance of the at least one adjacent region to the preset light transmittance.

In some implementations, the preset condition includes a first preset condition and a second preset condition different from the first preset condition, and the at least one processor is configured to set the light transmittance of the at least one adjacent region to the preset light transmittance by: determining whether the sensed information related to the vehicle satisfies the first preset condition or the second preset condition; based on a determination that the sensed information related to the vehicle satisfies the first preset condition, setting the light transmittance of the at least one adjacent region to a first preset light transmittance; and based on a determination that the sensed information related to the vehicle satisfies the second preset condition, setting the light transmittance of the at least one adjacent region to a second preset light transmittance different from the first preset light transmittance.

In some implementations, the preset first light transmittance is greater than the second preset light transmittance, the first preset condition includes any one of a surrounding brightness of the vehicle being higher than a reference brightness, the vehicle traveling on a highway, a presence of another vehicle traveling in an opposite direction within a predetermined distance from the vehicle, or the vehicle traveling on a downhill road, and the preset second condition includes any one of the surrounding brightness of the vehicle being lower than the reference brightness, the vehicle traveling on a dirt road or a one-way road, an absence of another vehicle traveling in an opposite direction within the predetermined distance from the vehicle, or the vehicle traveling on a uphill road.

In some implementations, the at least one processor is further configured to: determine that the information related to the vehicle satisfying the preset condition is not sensed through the sensing unit; and based on a determination that the information related to the vehicle satisfying the preset condition is not sensed through the sensing unit, restore the light transmittance of the at least one adjacent region to an original light transmittance.

In some implementations, the vehicle lamp further includes: a sensing unit configured to sense information related to a vehicle including the vehicle lamp, and the at least one processor is configured to: based on the sensed information related to the vehicle, control a portion of the plurality of pixels of the shield that blocks light from passing therethrough to vary a position of the cut-off line of the beam pattern with respect to the vehicle.

In some implementations, the at least one processor is configured to: determine whether the sensed information related to the vehicle satisfies a first preset condition or a second preset condition; based on a determination that the sensed information related to the vehicle satisfies the first preset condition, modify a light transmittance of a first portion of the plurality of pixels of the shield to block light from passing therethrough; and based on a determination that the sensed information related to the vehicle satisfies the second preset condition, modify a light transmittance of a second portion of the plurality of pixels different from the first portion to allow light to pass therethrough.

In some implementations, the first preset condition includes the vehicle being oriented on an incline and the second preset condition includes the vehicle being oriented on a decline, the light received by the shield is a reflected light, the modifying of the light transmittance of the first portion of the plurality of pixels of the shield moves the cut-off line of the beam pattern in a upward direction, and the modifying of the light transmittance of the second portion of the plurality of pixels of the shield moves the cut-off line of the beam pattern in a downward direction.

In some implementations, the at least one processor is configured to: determine that a high-beam output request is received; and based on a determination that a high-beam output request is received, control at least a part of the portion of the plurality of pixels of the shield that is configured to block light from passing therethrough to allow light to pass through.

In another aspect, a vehicle includes: a plurality of wheels; a power source configured to drive at least one of the plurality of wheels; and the vehicle lamp.

In some scenarios, according to some implementations of the present disclosure, one or more of the following effects may be achieved.

First, according to the present disclosure, it may be possible to output various beam patterns using a shield including a plurality of pixels and configured to independently control light transmittance for each pixel.

Second, according to the present disclosure, it may be possible to form a more detailed beam pattern using a shield configured to control light transmittance and a fixed shield together.

Third, according to the present disclosure, it may be possible to provide an optimized vehicle lamp configured to enhance low-beam patterned light and high-beam patterned light using a rotatable second reflector and/or an auxiliary light source.

The details of one or more implementations are set forth in the accompanying drawings and the description below. Other features will be apparent from the description and drawings, and from the claims. The description and specific examples below are given by way of illustration only, and various changes and modifications will be apparent.

DETAILED DESCRIPTION

A vehicle lamp is described herein that adaptively provided various beam patterns for various driving situations.

In some implementations, the vehicle lamp may output a beam pattern in an optimized manner.

In some implementations, the vehicle lamp may output an optimized low-beam pattern during a low-beam operation, and output an optimized high-beam pattern during a high-beam operation.

In some implementations, the vehicle lamp may adaptively control a beam pattern in a region around a cut-off line.

In some implementations, the vehicle lamp may enhance a low-beam patterned light or a high-beam patterned light in an optimized manner using a rotatable second reflector and/or an auxiliary light source.

In some implementations, various beam patterns may be output using a shield including a plurality of pixels and configured to independently control light transmittance of each pixel.

In some implementations, a more detailed beam pattern may be formed, or the beam pattern may be more precisely controlled by arranging a shield configured to control light transmittance and a fixed shield such that the two shields overlap along a path of light generated by a light source unit.

In accordance with an implementation of the present disclosure, a vehicle lamp may include at least one light source, a first reflector configured to reflect light generated by the light source, a shield configured to block part of light reflected from the first reflector to form a beam pattern, a lens configured to project light that has passes through the shield to an outside thereof, and a second reflector configured to reflect light reflected from the first reflector back to the first reflector or reflect light generated by the light source to be incident on the lens, wherein the second reflector is formed to be rotatable with respect to one axis and disposed at a different position when outputting a low-beam and when outputting a high-beam, respectively.

A vehicle according to an implementation of the present disclosure may include, for example, a car or a motorcycles or any suitable motorized vehicle. Hereinafter, the vehicle will be described based on a car.

The vehicle according to the implementation of the present disclosure may be powered by any suitable power source, and may be an internal combustion engine car having an engine as a power source, a hybrid vehicle having an engine and an electric motor as power sources, or an electric vehicle having an electric motor as a power source.

In the following description, a left side of a vehicle refers to a left side in a driving direction of the vehicle, and a right side of the vehicle refers to a right side in the driving direction.

Figure 1:
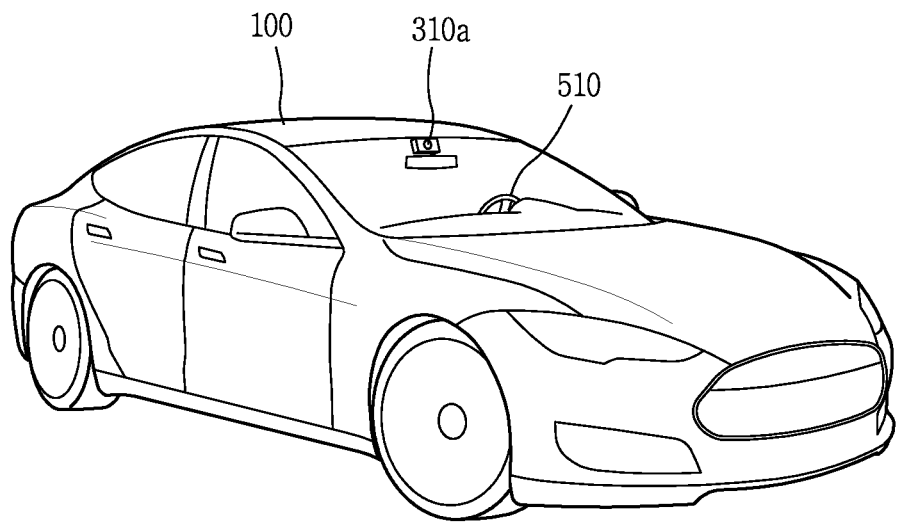
FIG. 1 is a diagram illustrating an example of an exterior of a vehicle.
Figure 1:
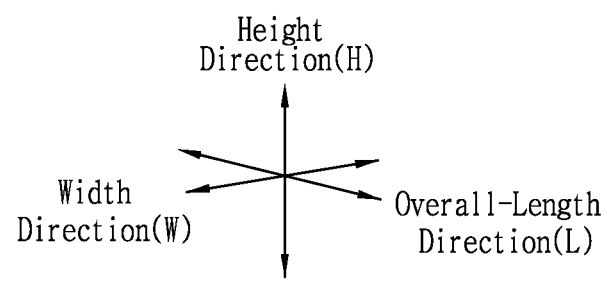
Figure 2:
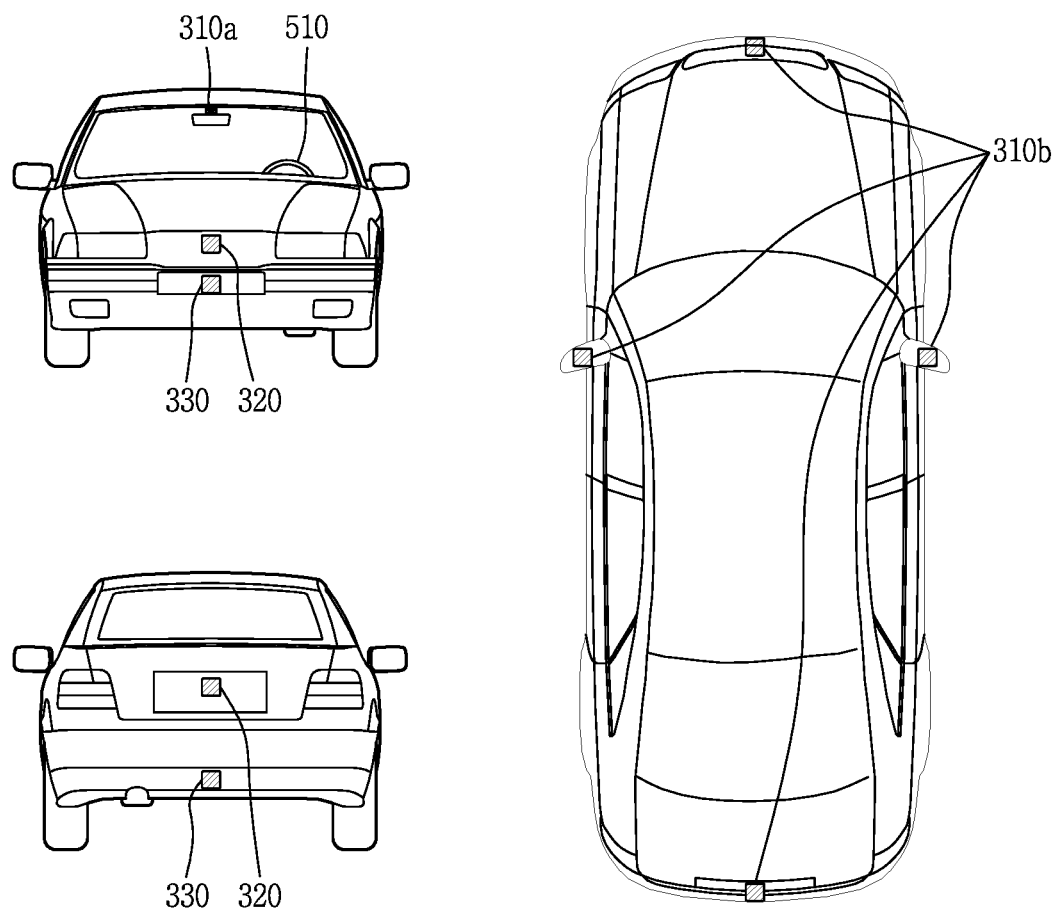
FIG. 2 is a diagram illustrating an example of a vehicle at various angles.
Figure 3:
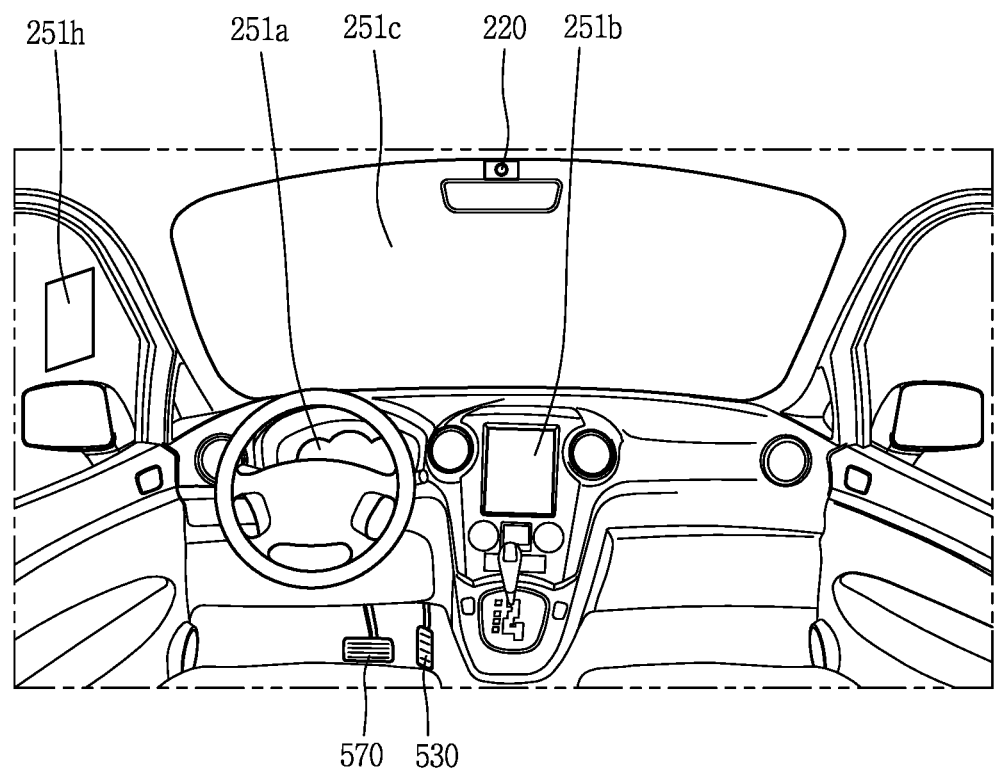
FIGS. 3 and 4 are views illustrating an interior portion of an example of a vehicle.
Figure 4:
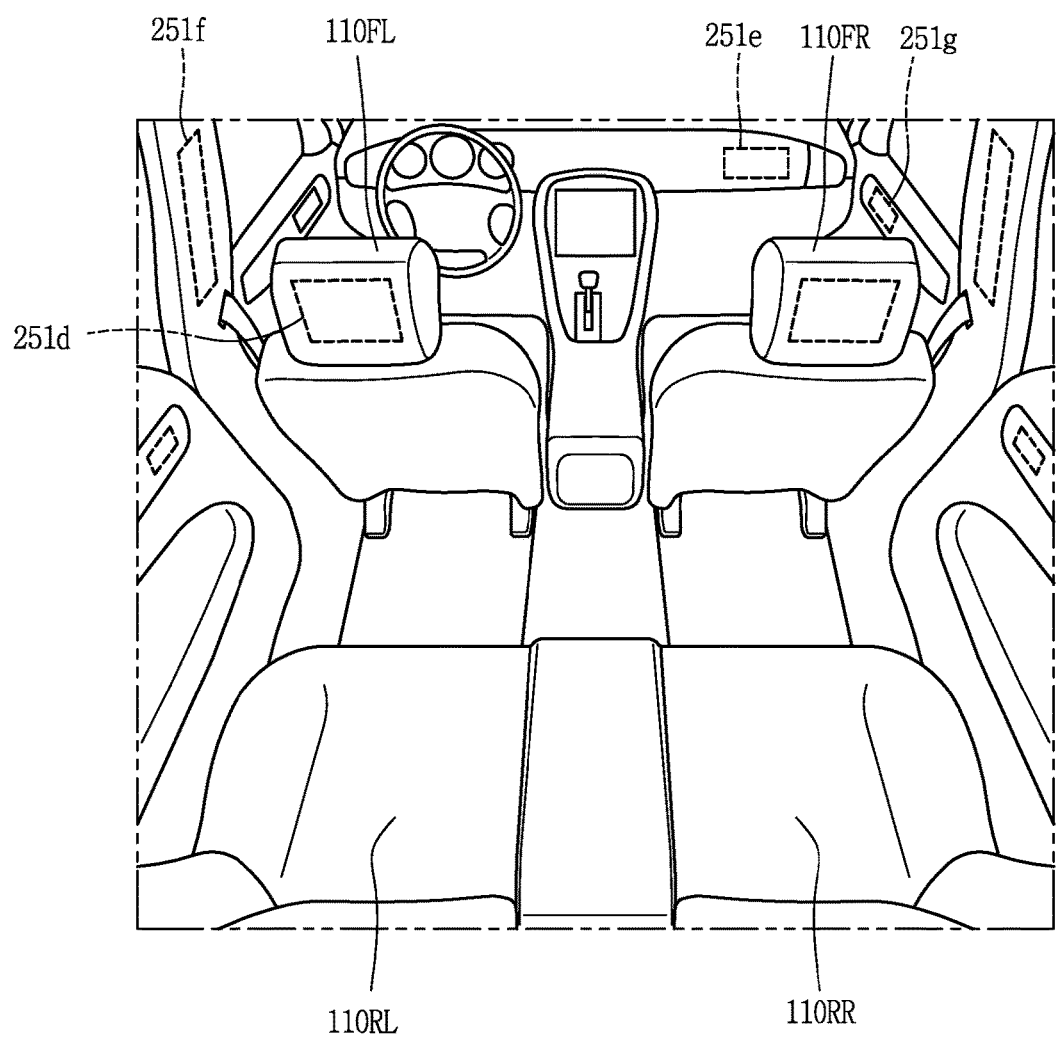

FIG. 1 illustrates an example of an exterior of a vehicle; FIG. 2 illustrates an example of a vehicle at various angles; and FIGS. 3 and 4 illustrate an interior portion of an example of a vehicle.

Figure 5:
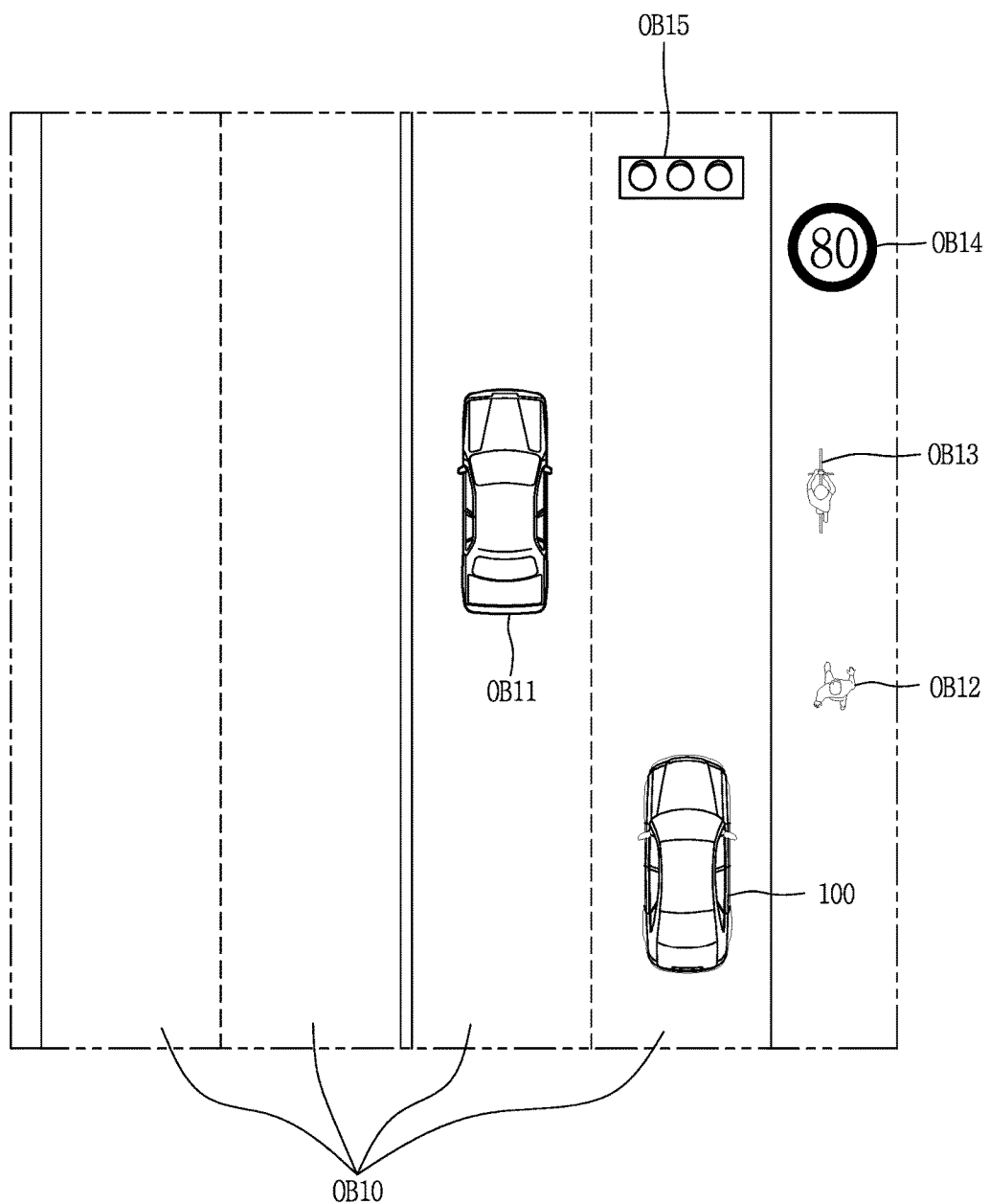
FIGS. 5 and 6 are reference views illustrating examples of objects that are relevant to driving.
Figure 6:
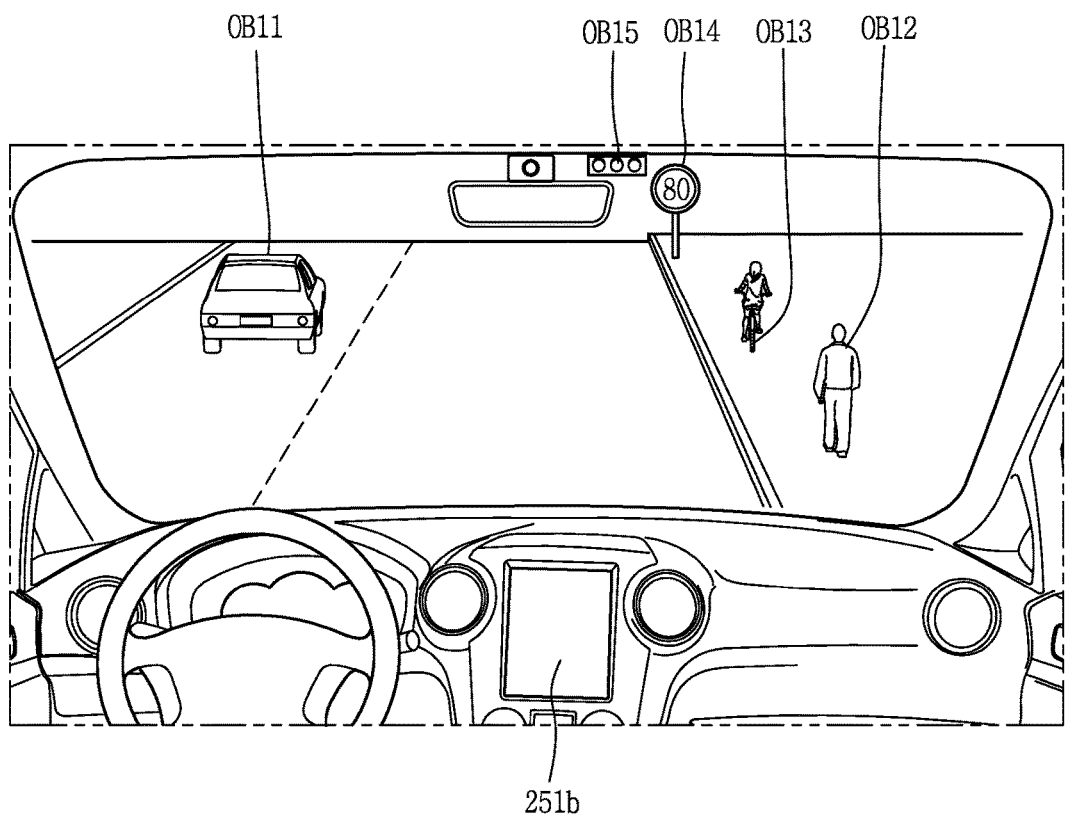
Figure 7:
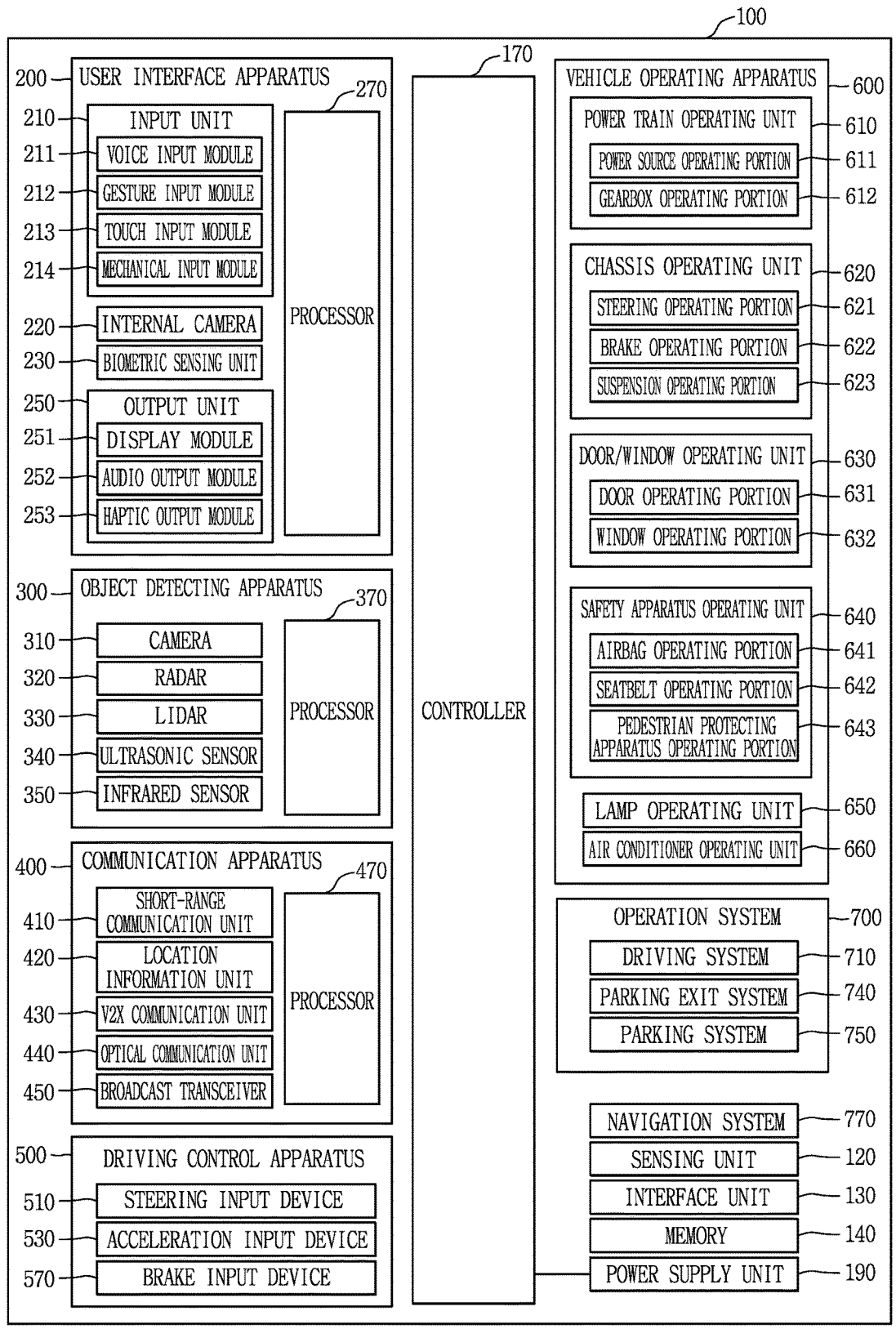
FIG. 7 is a block diagram illustrating subsystems of an example of a vehicle.

FIGS. 5 and 6 illustrate examples of objects that are relevant to driving; and FIG. 7 illustrate subsystems of an example of a vehicle.

As illustrated in FIGS. 1 to 7, a vehicle 100 may include wheels turning by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided by an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, at least one processor such as controller 170 and a power supply unit 190.

In some implementations, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and at least one processor, such as processor 270.

In some implementations, the user interface apparatus 200 may include more components in addition to components to be explained in this specification or may not include some of those components to be explained in this specification.

The input unit 200 may allow the user to input information. Data collected in the input unit 120 may be analyzed by the processor 270 and processed as a user's control command.

The input unit 210 may be disposed within the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

In some implementations, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

In some implementations, the touch input module 213 may be integrated with the display unit 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

In some implementations, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an implementation, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

In some implementations, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a geographical feature, an animal and the like.

The lane OB01 may be a driving lane, a lane next to the driving lane or a lane on which another vehicle comes in an opposite direction to the vehicle 100. The lanes OB10 may include, for example, left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated by a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The geographical feature may include a mountain, a hill and the like.

In some implementations, objects may be classified into a moving object and a fixed object. For example, the moving object may include another vehicle and a pedestrian. The fixed object may be, for example, a traffic signal, a road and a structure.

The object detecting apparatus 300 may include a camera 310, a radar 320, a LiDAR 330, an ultrasonic sensor 340, an infrared sensor 350 and at least one processor, such as a processor 370.

According to an implementation, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keying (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an implementation, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and at least one processor, such as a processor 470.

According to an implementation, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency Identification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an implementation, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an implementation, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

In some implementations, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving direction of the vehicle 100 from the user. The steering input device 510 is preferably configured in the form of a wheel allowing a steering input in a rotating manner. According to some implementations, the steering input device may also be configured in a shape of a touch screen, a touchpad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some implementations, the acceleration input device or the brake input device may also be configured in a shape of a touch screen, a touchpad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some implementations, the vehicle operating apparatus 600 may further include other components in addition to the components described, or may not include some of the components described.

In some implementations, the vehicle operating apparatus 600 may include at least one processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, when a fossil fuel-based engine is used as the power source, the power source operating portion 611 may perform an electronic control for the engine. Accordingly, an output torque and the like of the engine can be controlled.

The power source operating portion 611 may adjust the engine output torque according to the control of the controller 170.

For example, when an electric energy-based motor is used as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

In some implementations, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

In some implementations, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

In some implementations, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, and 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include at least one processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may include a driving system 710, a parking exit system 740 and a parking system 750.

In some implementations, the operation system 700 may further include other components in addition to components to be described, or may not include some of the components to be described.

In some implementations, the operation system 700 may include at least one processor. For example, each unit of the operation system 700 may individually include a processor.

In some implementations, the operation system may be implemented by the controller 170 in a software configuration.

According to some implementations, the operation system 700 may include at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and at least one processor. The memory may store the navigation information. The processor may control an operation of the navigation system 770.

In some implementations, the navigation system 770 may update prestored information by receiving information from an external device through the communication apparatus 400.

In some implementations, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

In some implementations, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

In some implementations, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

The vehicle 100 according to the present disclosure may include a vehicle lamp 800. Specifically, the vehicle lamp 800 may include all lamps provided in the vehicle 100.

The vehicle lamp 800 may include a head lamp provided in front of the vehicle 100. The head lamp may be provided on at least one of a front left side and a front right side of the vehicle 100. The head lamp may be configured to output, project, irradiate, discharge, emit, or generate light to at least one of a front side, a front left side, and a front right side of the vehicle 100.

The head lamp may include at least one of a low-beam output module, a high-beam output module, a turn signal light, an emergency light, a fog light, and a corner light.

Furthermore, the vehicle lamp 800 may also include a rear lamp (or a rear combination lamp) provided at a rear side of the vehicle 100. The rear lamp may be provided on at least one of a rear left side of the vehicle 100 and a rear right side of the vehicle or provided integrally on a rear surface of the vehicle 100. The rear lamp may be formed to output light to at least one of a rear side, a rear left side, and a rear right side of the vehicle 100.

The rear lamp may include at least one of a brake lamp, a reverse lamp, a turn signal lamp, and a tail lamp.

In addition, the vehicle lamp 800 may include a side lamp provided on a side surface of the vehicle. For example, the side lamp may include a turn signal lamp or an emergency lamp provided in a side mirror of the vehicle.

Furthermore, the vehicle lamp 800 of the present disclosure may include a lamp module that forms a high or low-beam pattern, a positioning lamp, a daytime running lamp (DRL), and an adaptive front lighting system (AFLS) or the like, or may be separately provided in a separate form.

As described above, the vehicle lamp 800 described in this specification may be applied to all types of lamps that can be provided in a vehicle.

In some implementations, at least one processor configured to control the vehicle lamp 800 may be provided. For example, the processor may be the lamp operating unit 650 or the controller 170 illustrated in FIG. 7. In some implementations, the processor may be an additional processor provided in the vehicle lamp 800.

In this specification, an example configuration is described in which a processor 870 for controlling the vehicle lamp 800 is included in the vehicle lamp 800. However, the present disclosure will not be limited thereto, and all contents/functions/features related to the processor 870 described herein may be carried out by, for example, the lamp operating unit 650 or the controller 170.

The processor 870 may receive a control signal for controlling the vehicle lamp 800 and generate a control signal for controlling the vehicle lamp 800 based on an ADAS (Advanced Driver Assistance Systems) function.

The processor 870 may control the power supply unit 190 such that the power of the power supply unit 190 is supplied to the vehicle lamp 800 based on the control signal.

Furthermore, the processor 870 may control the operation of a light source unit 810 and a shield 840 (or shield unit) included in the vehicle lamp 800 based on the control signal.

Various implementations in which the light source unit 810 and the shield 840 are operated under the control of the processor 870 will be described later in detail with reference to the accompanying drawings.

Figure 8:
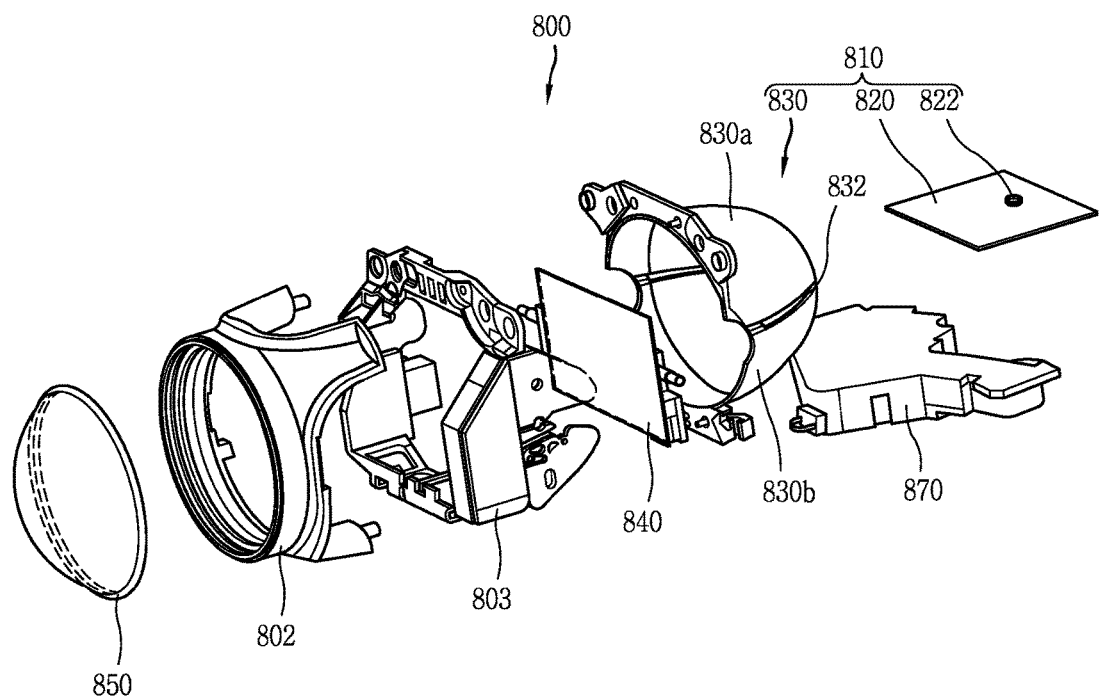
FIG. 8 is an exploded view illustrating an example of a vehicle lamp according to some implementations disclosed herein.
Figure 9A:
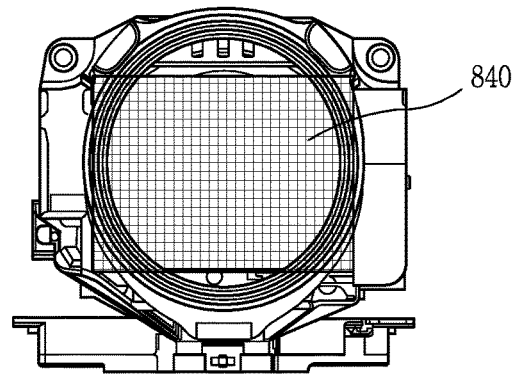
FIG. 9A is a front view illustrating the vehicle lamp illustrated in FIG. 8.
Figure 9B:
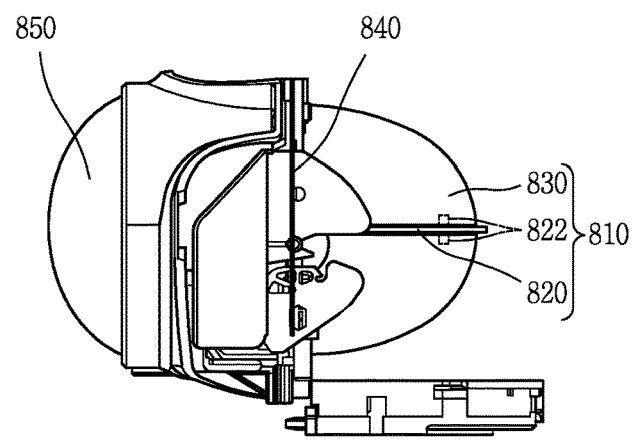
FIGS. 9B-9C are side views illustrating the vehicle lamp illustrated in FIG. 8.
Figure 9C:
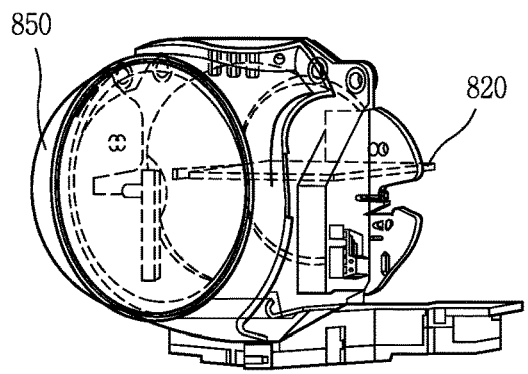

FIG. 8 illustrates an exploded view of an example of a vehicle lamp according to some implementations disclosed herein; FIG. 9A illustrates a front view of the vehicle lamp illustrated in FIG. 8; FIGS. 9B-9C illustrate side views of the vehicle lamp illustrated in FIG. 8.

Figure 10B:
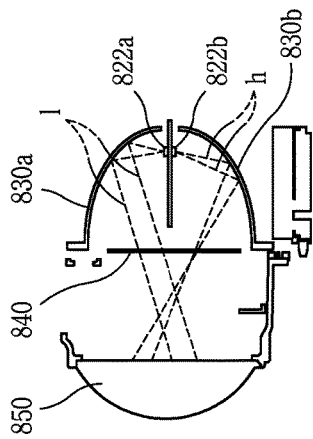
FIGS. 10B-10D are cross-sectional views illustrating various examples of a light source unit applicable to the present disclosure.
Figure 10C:
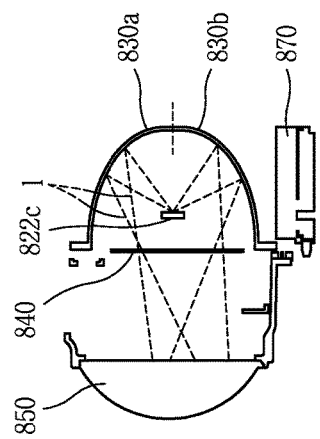
Figure 10D:
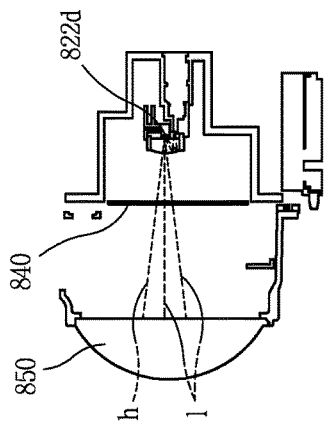
Figure 10A:
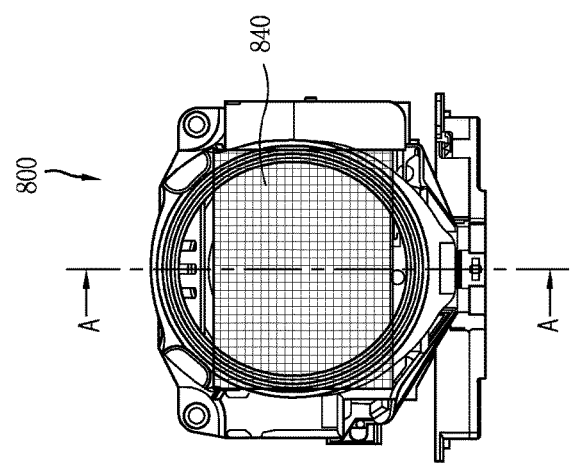
FIG. 10A is a front view illustrating the vehicle lamp illustrated in FIG. 8.

FIG. 10A illustrates a front view of the vehicle lamp illustrated in FIG. 8 and FIGS. 10B-10D illustrate cross-sectional views of various examples of a light source unit applicable to the present disclosure.

FIGS. 11-16B illustrate diagrams of various methods of controlling the vehicle lamp illustrated in FIG. 8.

The vehicle lamp 800 related to the present disclosure may include a lens 850, a first case 802, a second case 803, a shield 840, a light source unit 810, and at least one processor, such as a processor 870.

In this specification, a direction in which light is output from the vehicle lamp 800 is defined as being the front. Specifically, the front (F) may denote a direction of light output from a light source of the vehicle lamp 800 through the lens 850. For example, the light generated by the light source 822 travels in the front direction along an optical axis (e.g., an axis perpendicular to a front surface of the lamp 800) to a front surface of the vehicle lamp ("lens side"). For example, the front (F) may denote a direction from the light source unit 810 to the lens 850.

The light source unit 810 may include at least one of an optical module 820 including at least one light source 822 and a reflector 830.

The optical module 820 may be disposed within the reflector 830. The light source 822 of the optical module 820 disposed within the reflector 830 emits light to reflectors 830a and 830b provided within the reflector 830.

For an example, the optical module 820 may be mounted with a light source 822 on a substrate (e.g., a printed circuit board (PCB substrate)) as illustrated in FIG. 8. Furthermore, the reflector 830 may be provided with a groove 832 formed to allow insertion of the optical module 820 therein. A first reflector 830a ("an upper reflector") may be provided at an upper side of the groove 832 and a second reflector 830b ("a lower reflector") may be provided at a lower side of the groove 832.

The optical module 820 may be inserted into the groove 832 to allow positioning of the light source 822 within the reflector 830. However, the present disclosure is not limited thereto, and the optical module 820 or the light source 822 may be disposed within the reflector 830 in various ways.

The reflectors 830a, 830b of the reflector 830 may be formed to reflect light generated by the light source 822 in a forward direction. For example, the reflectors 830a, 830b of the reflector 830 may have a hemispherical shape to reflect light generated by the light source 822 toward the lens 850.

In addition, the reflectors 830a, 830b may have reflective surfaces with various shapes in order to modify an output beam pattern in various ways.

Various types of light sources 822a, 822b may be implemented to generate light. For example, the light sources 822a, 822b may be a halogen light source, a light emitting diode (LED), a micro LED, a matrix LED, a laser diode (LD), and the like. In general, light sources 822a and 822b may include any suitable type of light sources configured to generate light.

A second case 803 may be mounted forward of the reflector 830. The shield 840 of the present disclosure may be mounted on the second case 803.

The first case 802 is mounted on the front of the second case 802 and the lens 850 of the present disclosure can be mounted on the first case 802.

As such, in some implementations, the vehicle lamp 800 includes a light source unit 810 including at least one light source 822, a lens 850 located forward of the light source unit to transmit light generated by the light source unit, a shield 840 located between the light source unit 810 and the lens 850, and formed to allow at least part of the light generated by the light source unit 810 (e.g., by the light source 822) to pass through.

The second case 803 may be coupled to a front side of the reflector 830. The shield 840 formed to allow at least part of light generated by the light source unit 810 to pass through may be coupled to the second case 802.

The second case 803 may include an inner space configured for mounting of the shield 840. Furthermore, the second case 802 may include a groove for fixing a body (e.g., a cylindrical rod) for supporting the shield 840. The shield 840 may be positioned within the second case 802 by inserting (or fixing) the body into the groove.

Furthermore, the vehicle lamp 800 of the present disclosure may include an operating unit for operating (e.g., rotating) the shield 840. The operating unit may be provided at an inner or outer portion of the second case 802.

The second case 803 may be referred to as, for example, a static module.

In some implementations, the first case 802 may be coupled to a front side of the second case 803.

One surface (e.g., a rear surface) of the first case 802 is coupled to the second case 803 and another surface (e.g., a front surface) of the first case 802 is coupled to the lens 850.

The first case 802 may form an internal space to facilitate the operation of the shield 840 provided in the second case 803. Furthermore, the first case 802 may also form an internal space for correcting an optical path of the light transmitted by the shield 840 provided in the second case 803.

The first case 802 may be referred to as, for example, a holder.

Although the example of FIG. 8 describes the first case 802 and the second case 803 as being separate components, implementations of the present disclosure are not limited thereto. For example, in some implementations, the first case 802 and the second case 803 may be integrally formed.

Hereinafter, the shield 840 included in the vehicle lamp of the present disclosure will be described in more detail.

Figure 11:
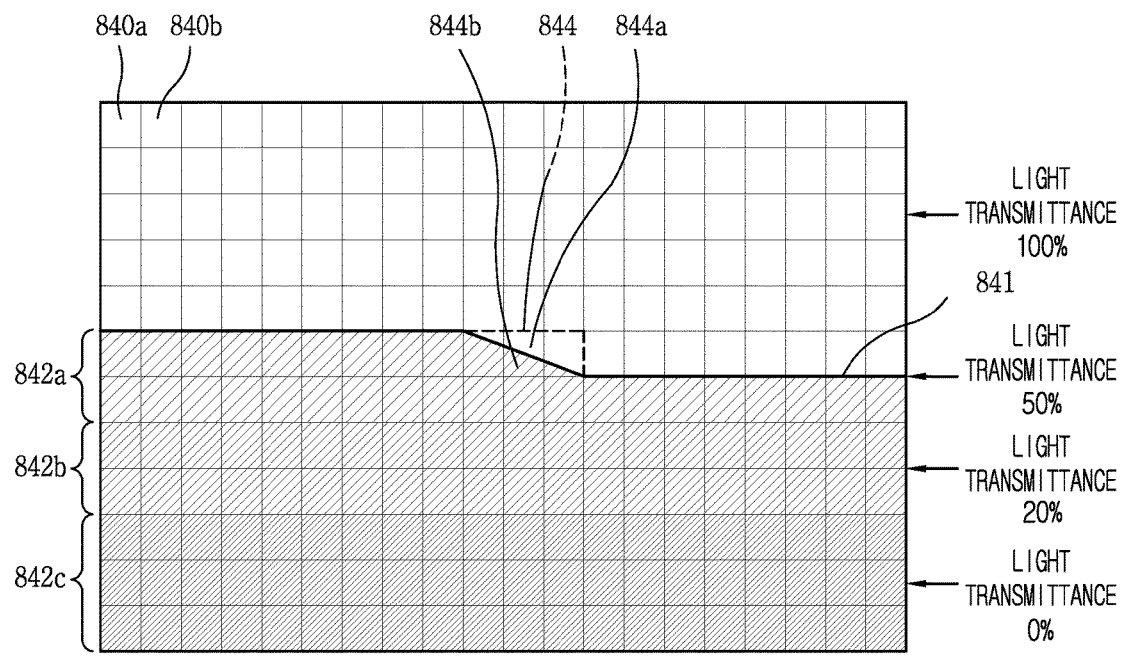
FIGS. 11-16B are diagrams illustrating various methods of controlling the vehicle lamp illustrated in FIG. 8.

Referring to FIG. 11, the shield 840 may include a plurality of pixels, and may be formed to independently control light transmittance (or optical transmittance) of each pixel.

Through this, the vehicle lamp of the present disclosure may control the light transmittance of at least part of the plurality of pixels included in the shield 840 to block at least part of light generated by the light source unit 810.

The present disclosure may include a plurality of pixels and control the light transmittance of at least part of the plurality of pixels, thereby providing a vehicle lamp configured to project light with various beam patterns.

The shield 840 of the present disclosure may include a plurality of pixels 840a, 840b as illustrated in FIG. 11. Each of the plurality of pixels 840a, 840b included in the shield 840 (or each pixel) may be formed to independently control the light transmittance.

In some implementations, the plurality of pixels 840a, 840b may be arranged in a matrix form as illustrated in FIG. 11. Each of the plurality of pixels may be connected with a wiring for receiving a control signal. As another example, a plurality of pixels may be grouped into at least one group, and a wiring for receiving a control signal for each group may be connected to control light transmittance for each group.

For example, each of the plurality of pixels may be grouped into at least one row or at least one column.

In this specification, an example is described in which a wiring is connected to receive control signals for each of a plurality of pixels to independently control each pixel.

In some implementations, each pixel 844 may be formed to partially change the light transmittance. For example, one pixel may fall under a first region 844a and a second region 844b, and the first region 844a and the second region 844b may be configured to have different light transmittance characteristics.

As such, each pixel included in the shield 840 of the present disclosure may be configured to have variable light transmittance, and in some implementations, a light transmittance of a first sub portion of a pixel is controllable to be different from a second sub portion of the pixel.

Each pixel included in the shield 840 may be provided by various configurations (e.g., materials, techniques) configured to change the light transmittance. For example, each pixel may be an LC (Liquid Crystal) film, an LCD (Liquid Crystal Display), a stretch film, an ITO film, or the like having a variable light transmittance according to the strength of an applied electric signal (e.g., a current, a voltage, or electric power).

The shield 840 of the present disclosure may be referred to as, for example, a matrix shield, a display shield, or a variable shield.

In some implementations, the vehicle lamp 800 of the present disclosure may include a processor 870 for controlling the light transmittance of the shield 840.

The processor 870 may control constituent elements included in the vehicle lamp 800. In some implementations, as previously described, the processor 870 may be the lamp operating unit 650 or the controller 170.

The vehicle lamp 800 of the present disclosure may control the light transmittance of a plurality of pixels included in the shield 840 to form various types of beam patterns.

For example, processor 870 may control a portion of the plurality of pixels to block light from passing through such that a beam pattern generated by the light transmitted by the shield 840 has a cut-off line 841.

In some implementations, the cut-off line 841 may be configured such that when the vehicle lamp 800 outputs a low-beam ("downward light"), a predetermined cut-off line is generated in accordance with the regulation.

For example, a cut-off line may be defined as a boundary or a line in an illuminated region that forms when the light emitted by the vehicle lamp 800 is projected onto a planar surface (e.g., a wall surface) spaced by a predetermined distance from the vehicle lamp 800 (or the vehicle 100).

The cut-off line may denote a boundary line, at one side of which the brightness of light is greater than a reference brightness value when the light is projected on the plane.

Figure 12A:
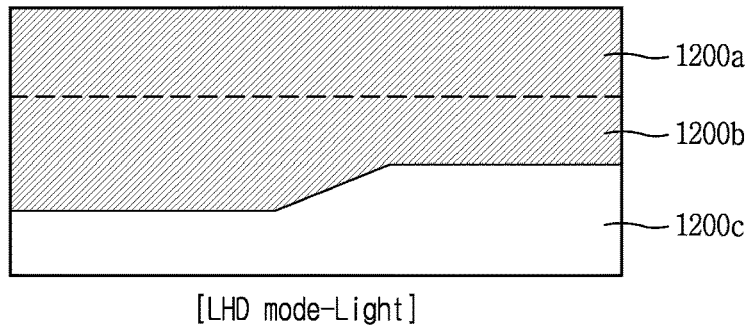
Figure 12A:
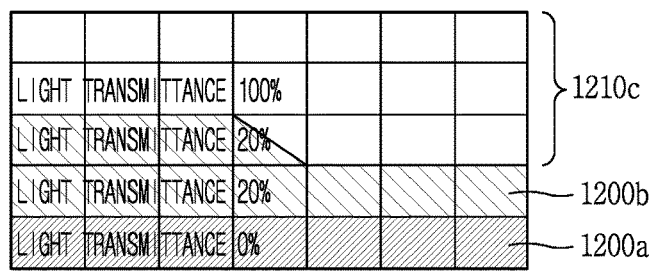
Figure 12B:
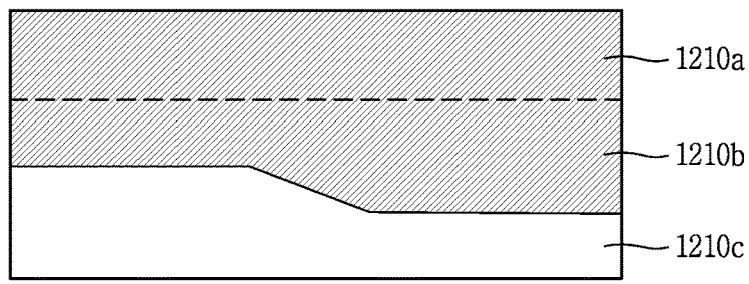
Figure 12B:
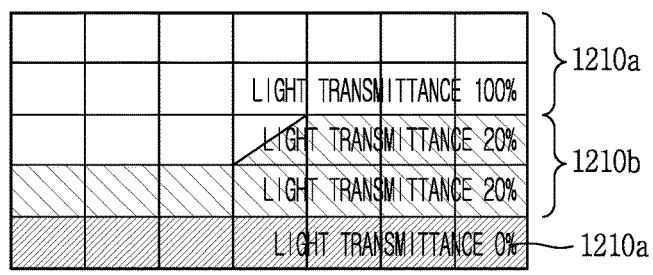

Referring to FIGS. 12A and 12B, a shape of the cut-off line may be defined differently according to the regulation. In general, the regulation may vary depending on the operating location of the vehicle lamp or the vehicle including the vehicle lamp. For example, the regulation may vary depending on the country, region, state, or city in which the vehicle including the vehicle lamp is operated.

For an example, in regions implementing a right-hand traffic regulation (in which drivers sit on the left side of the vehicle, or "left-hand drive") in which vehicles travel on respective right side of the road, a low-beam pattern (or cut-off line) with the left side lower than the right side should be projected as illustrated in FIG. 12A. As another example, in regions implementing a left-hand traffic regulation ("right-hand drive"), a low-beam pattern (or cut-off line) with the right side lower than the left side should be projected as illustrated in FIG. 12B.

Such low-beam patterns can help mitigate light from being projected onto the other vehicle traveling on the opposite side (or in the opposite direction), thereby preventing glare from affecting the driver of the other vehicle.

The processor 870 may determine a current location of the vehicle 100 provided with the vehicle lamp 800 based on information received from the location information unit 420. Furthermore, the processor 870 may control the light transmittance of a plurality of pixels included in the shield 840 to irradiate a low-beam pattern corresponding to a regulation applicable to the relevant country (or region, state) based on the current location.

The processor 870 may control a portion of the plurality of pixels of the shield 840 to block light from passing through (e.g., by controlling the light transmittance thereof to be zero) as illustrated in FIGS. 11 and 12, thereby projecting a light in a low-beam pattern.

Referring back to FIG. 11, when the light transmittance of a portion (e.g., 842a, 842b, 842c) of the plurality of pixels is controlled (e.g., the light transmittance is controlled to be zero), light directed to the portion where the light transmittance is set to 0 is blocked by the shield 840 (specifically, a portion of pixels in which the light transmittance is controlled to block transmission of the light) is blocked and does not reach the lens 850.

Accordingly, only a part of light generated by the light source unit 810 directed to the pixels not having a light transmittance of zero is transmitted to the lens 850 through the shield 840. The light received by to the lens 850 is then projected to the outside by the lens 850 to generate a predetermined beam pattern (e.g., a low-beam pattern or a cut-off line).

On the other hand, the shield 840 of the vehicle lamp 800 related to the present disclosure may be formed or controlled to allow each of the plurality of pixels to transmit only a portion of light received from the light source unit 810.

For example, the light transmittance of each pixel may be controlled to transmit only a portion of the received light. For example, if it is assumed that light having an intensity corresponding to 100 is received at a specific pixel and the light transmittance of the specific pixel is set (controlled) to 50%, the specific pixel may transmit light having an intensity corresponding to 50 from the initial intensity of the received light corresponding to 100. Accordingly, the brightness of light that has passed through respective pixels may be reduced (for example, the brightness of a portion of a beam pattern generated by light that has passed through the relevant pixel may be reduced).

In this manner, the processor 870 may independently control the light transmittance of a plurality of pixels included in the shield 840 to generate various patterns of light.

For example, as illustrated in FIG. 11, the light transmittance of pixels included in a first portion 842a of a plurality of pixels is set to 50%, and the light transmittance of pixels included in a second portion 842b other than the first portion is set to 20%, and the light transmittance of pixels included in a third portion 842c other than the first and second portions is set to 0% to generate a varying beam pattern, which may have a gradation effect.

As an example, in case of FIG. 11, the light transmittance of a plurality of pixels included in the shield 840 may be set to gradually increase along one direction (e.g., upward direction), thereby implementing a gradation effect (an effect of gradually increasing or decreasing brightness along a predetermined direction) on a beam pattern projected, for example, in a forward direction of the vehicle lamp 800, such as the optical axis direction of the vehicle lamp.

On the other hand, the processor 870 may control a portion of the plurality of pixels blocking the light from passing through in a different manner based on whether the incident light is directly received ("direct light") from the light source unit 810 or is reflected ("reflected light") before being received.

Referring to FIGS. 10A-10D, the light source unit 810 of the present disclosure may be configured to direct light generated by the light source 822 toward the reflector 830 such that the reflected light is incident on the shield 840. In this case, the light source unit 810 includes at least one light source 822 and a reflector 830 formed to reflect light generated by the light source 822 toward the shield 840.

FIGS. 10B-10D are cross-sectional views taken along line A-A of the vehicle lamp 800 shown in FIG. 10A.

Referring to FIG. 10B, the vehicle lamp 800 of the present disclosure may include a first light source 822a and a second light source 822b.

The first light source 822a may be formed to output light in an upward direction. The second light source 822b may be formed to output light in a downward direction.

The reflector 830 may include a first reflector 830a and a second reflector 830b. The first reflector 830a may be an upper reflector disposed at an upper side with respect to an axis horizontally crossing the center of the reflector 830.

The second reflector 830b may be a lower reflector disposed at a lower side with respect to the axis horizontally crossing the center of the reflector 830.

Referring to FIG. 10B, light (l) generated by the first light source 822a may be reflected by the first reflector 830a and directed to the shield 840 (e.g., an upper end of the shield 840).

The light (l) generated by the first light source 822a and reflected by the first reflector 830a may form a low-beam pattern. For example, the light (l) generated upward from the first light source 822a is reflected by the first reflector 830a and projected in a downward direction. As such, the first reflector 830a may be a reflector configured to form a low-beam pattern.

Still referring to FIG. 10B, light (h) generated by the second light source 822b may be reflected by the second reflector 830b and directed to the shield 840 (e.g., a lower end of the shield 840).

The light (h) generated by the second light source 822b and reflected by the second reflector 830b may form a high-beam pattern. For example, light generated downward from the second light source 822b may be reflected by the second reflector 830b and irradiated in an upward direction. As such, the second reflector 830b may be configured to form a high-beam pattern.

During operation, the processor 870 may turn on only the first light source 822a and turn off the second light source 822b when outputting a low-beam. On the other hand, when outputting a high-beam, the processor 870 may turn on the first light source 822a and the second light source 822b together or turn on only the second light source 822b.

On the other hand, FIG. 10C illustrates a case where the vehicle lamp 800 for a vehicle includes one light source 822c. In this case, the light source 822c may be formed to generate light toward the rear side opposite to the front side.

The reflector 830 may be provided at a rear side of the light source 822c. Here, the reflector 830 includes a first region (corresponding to the first reflector 830a) disposed at an upper side with respect to an axis horizontally crossing the center thereof, and a second region (corresponding to the second reflector 830b) at a lower side thereof.

The light reflected by the first region 830a of the reflector among light generated toward the reflector by the light source 822c may form a low-beam pattern and the light reflected by the second region 830b of the reflector may form a high-beam pattern.

Such formation of beam patterns is a result of light emitted toward the first region 830a of the reflector among light generated by the light source 822c being reflected downward by the first region 830a to transmit through the lens 850, and the light emitted toward the second region 830b of the reflector is reflected upward by the second region 830b to transmit through the lens 850.

Examples of the vehicle lamp 800 illustrated in FIGS. 10B and 10C differ in the number of light, but are similar in an aspect that the light forming a low-beam pattern and a high-beam pattern undergoes a reflection. In the examples of FIGS. 10B and 10C, light incident on the shield 840 corresponds to reflections of the light generated by the light source unit 810.

In some implementations, referring to FIG. 10D, when the light source 822d is a laser light source (LD), the light source 822d may be formed to emit light in a forward direction. In this case, the light source unit 810 may not include the reflector 830.

In such configurations, the light emitted by the light source 822d is directly incident on the shield 840. As such, in case of FIG. 10D, the light generated by the light source unit 810 and emitted to the shield 840 corresponds to direct light.

Light directly emitted toward an upper end of the shield 840 among the light generated by the light source 822d may form a high-beam pattern, and light directly emitted toward a lower end of the shield 840 may form a low-beam pattern.

Here, an upper end of the shield 840 may include at least one of a plurality of pixels arranged above the center of the shield, and a lower end of the shield 840 may include at least one of a plurality of pixels arranged below the center of the shield.

In some implementations, the processor 870 may control the pixels of a first portion of the plurality of pixels of the shield 840 to block light from passing through when light incident from the light source unit 810 is reflected light. In addition, the processor 870 may control the pixels of a second portion different from the first portion of the plurality of pixels of the shield 840 to block light from passing through when light incident from the light source unit 810 is direct light.

For example, when outputting a low-beam, the processor 870 may control the pixels of a first portion (e.g., a lower end portion 1210a, 1210b) of the plurality of pixels of the shield 840 to block light from passing through when light incident from the light source unit 810 is reflected light as illustrated in FIGS. 11 and 12. In this case, the pixels of a second portion (e.g., an upper end portion 1210c) of the plurality of pixels of shield 840 may be controlled by processor 870 to allow light to pass through.

In case of reflected light, a beam pattern 1200c generated through the shield 840 may be vertically inverted or vertically and horizontally inverted with respect to a portion 1210c in which a light transmittance (e.g., a light transmittance of 100%) is controlled (set) to allow light to pass through.

For example, when light generated by the light source is reflected by an upper reflector (or an upper region of the reflector), the light is projected in a downward direction, and when the light is reflected by a lower reflector (or a lower region of the reflector), the light is projected in an upward direction.

Similar principles may be also applied to a case of being horizontally inverted. In the case where the reflector has a hemispherical shape, light generated by the light source is reflected by a left reflector (or a left region of the reflector) and projected in the right direction, and light reflected by a right reflector (or a right region of the reflector) is projected in the left direction.

In this specification, as illustrated in FIG. 12, an example case is described where a shape of a beam pattern 1200c resulting from passing of reflected light through the shield 840 is vertically inverted with respect to a shape of a portion 1210c in which the light transmittance (e.g., light transmittance of 100%) is controlled (set) to pass light through the shield 840.

However, depending on a shape of the reflector 830 (or 830a, 830b), the shape of the beam pattern 1200c may be a vertically and horizontally inverted shape with respect to the shape of the portion 1210c in which the light transmittance is controlled (set) to pass light through the shield 840.

In case of direct light, the processor 870 may control a second portion (e.g., an upper end portion 1210c of the shield 840) different from a first portion of a plurality of pixels of the shield 840 to block light from passing through when outputting a low-beam. For example, the pixels of a first portion (e.g., a lower end 1210a, 1210b) of the plurality of pixels of the shield 840 may be controlled by processor 870 to pass light through.

In case of direct light, a beam pattern 1200c generated through the shield 840 may correspond to a shape of a portion 1210a, 1210b in which the light transmittance (e.g., light transmittance of 100%) is controlled to allow light to pass through. It is generated by allowing light to directly pass through the shield 840 and then projected by the lens 850 without first reflecting the light using the reflector. Accordingly, the beam pattern 1200c is not vertically inverted or vertically and horizontally inverted in case of direct light.

To account for the inversion of resulting beam-pattern depending on the presence of a reflector, the processor 870 changes a portion of the plurality of pixels to block light from passing through depending on the type of light incident on the shield 840 from the light source unit 810. As such, the processor 870 controls the plurality of pixels based on a presence or absence of a reflector.

For an example, when light incident on the shield 840 from the light source unit 810 is reflected light (i.e., a reflector is present), the processor 870 may control the light transmittance of pixels included in a first portion of the plurality of pixels to block light from passing through the first portion (e.g., a lower end portion). The first portion may be formed to include a cut-off line of a low-beam pattern.

As another example, when light incident on the shield 840 from the light source unit 810 is direct light (i.e., reflector is not present), the processor 870 may control the light transmittance of pixels included in a second portion different from the first portion of the plurality of pixels to block light from passing through the second portion (e.g., an upper end portion). The second portion may also be formed to include a cut-off line of a low-beam pattern.

When a high-beam output request is received, the processor 870 may modify at least a part of a portion blocking light from passing through to allow light to pass through.

For example, when light incident on the shield 840 from the light source unit 810 is reflected light, the processor 870 may control at least part of a first portion (e.g., lower end portion) of a plurality of pixels of the shield 840 previously set to block light from passing through to allow light to pass through when a high-beam output request is received.

As another example, when light incident on the shield 840 from the light source unit 810 is direct light, the processor 870 may control at least a part of a second portion (e.g., upper end portion) of a plurality of pixels of the shield 840 previously set to block light from passing through to allow light to pass through when a high-beam output request is received.

In general, the processor 870 of the present disclosure may independently control the light transmittance of a plurality of pixels included in the shield 840, thereby controlling the shield 840 to output various beam patterns of light according to circumstance.

In some implementations, the processor 870 senses information related to a vehicle using the sensing unit 120 provided in the vehicle. The information related to the vehicle may be at least one of vehicle information, a driving state of the vehicle, or the surrounding information of the vehicle.

For example, the vehicle information may include a driving speed of the vehicle, a weight of the vehicle, a number of passengers in the vehicle, a braking force of the vehicle, a maximum braking force of the vehicle, a driving mode of the vehicle (e.g., autonomous driving mode or manual driving mode), a parking mode of the vehicle (e.g., autonomous parting mode, automatic parking mode, manual parking mode), whether or not a user is present on the vehicle, and information associated with the user (e.g., whether or not the user is an authenticated user), and the like.

The surrounding information of the vehicle may be a state of road surface on which the vehicle is travelling, weather, a distance from a front-side or a rear-side vehicle, a relative speed of a front-side or a rear-side vehicle, a curvature of a curved driving lane, an ambient brightness of the vehicle, information associated with an object present in a reference region (e.g., predetermined region) based on the vehicle, whether or not an object enters or leaves the predetermined region, whether or not a user is present around the vehicle, and information associated with the user (e.g., whether or not the user is an authenticated user), and the like.

Furthermore, the surrounding information, including the surrounding environment information, of the vehicle may include external information of the vehicle (e.g., ambient brightness, a temperature, a position of the sun), nearby subject (e.g., a person, another vehicle, a sign, etc.) information, a type of driving road surface, a landmark, line information, driving lane information, and information required for operation of the vehicle in autonomous driving/autonomous parking/automatic parking/manual parking mode.

Furthermore, the surrounding information of the vehicle may further include a distance from an object existing around the vehicle to the vehicle 100, a type of the object, a parking space for the vehicle, an object for identifying the parking space (e.g., a parking line, a string, another vehicle, a wall, etc.), and the like.

Furthermore, information associated with the vehicle may include various modes of operation set by a user input.

Figure 13A:
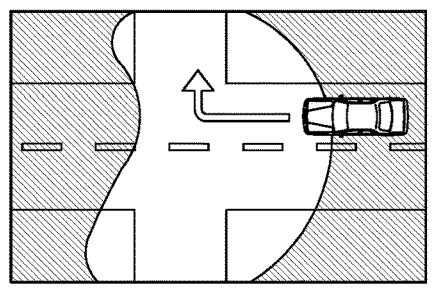
Figure 13A:
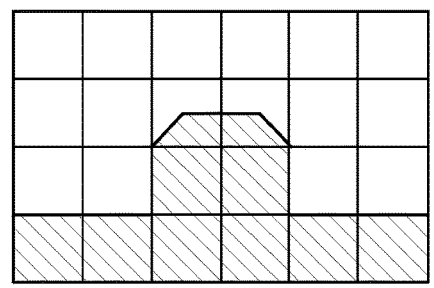

For example, as illustrated in FIG. 13A, when a first preset condition is satisfied (e.g., when it is sensed through the sensing unit 120 that the vehicle is traveling on a lane adjacent to a sidewalk, or the vehicle is set to a user attention mode by the user), the processor 870 may control the pixels of a portion associated with the first condition among a plurality of pixels of the shield 840 to block light from passing through to output light corresponding to a first beam pattern corresponding to the first condition.

Figure 13B:
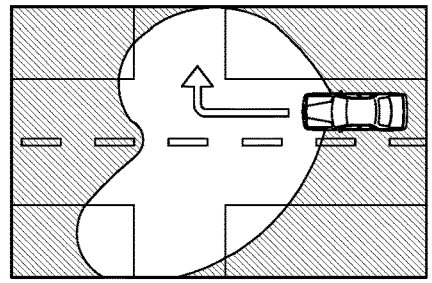
Figure 13B:
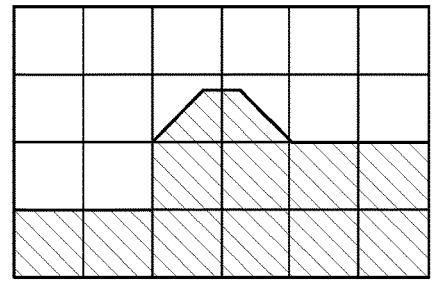
Figure 13C:
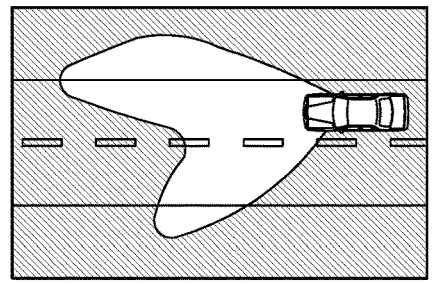
Figure 13C:
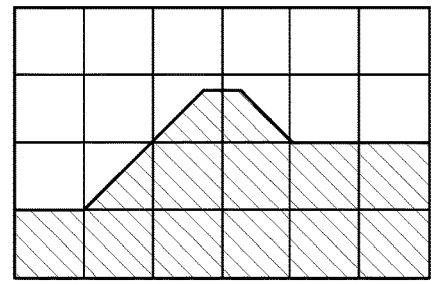
Figure 13D:
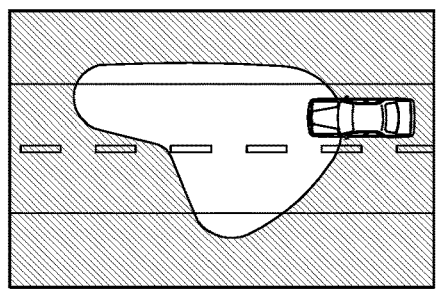
Figure 13D:
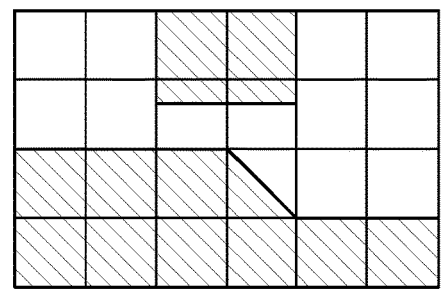
Figure 13E:
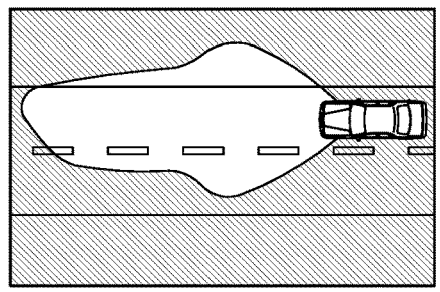
Figure 13E:
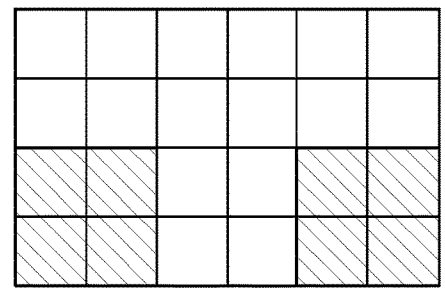
Figure 13F:
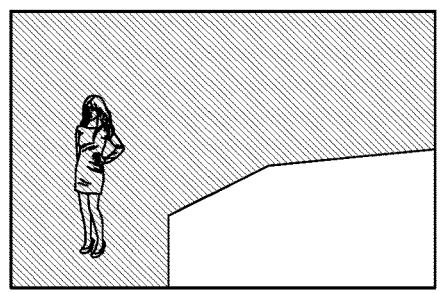
Figure 13F:
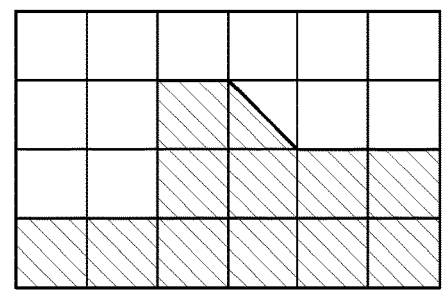

For another example, as illustrated in FIG. 13B, when a second preset condition different from the first condition is satisfied (e.g., when it is sensed that a current location of the vehicle is a town), the processor 870 may control the pixels of a portion associated with the second condition among a plurality of pixels of the shield 840 to block light from passing through to output light corresponding to a second beam pattern corresponding to the second condition, the second beam different from the first beam pattern.

FIGS. 13A, 13B, 13C, 13D, 13E and 13F illustrate respective beam pattern and light transmittance of a shield when the vehicle is set to a user attention mode, when the vehicle is set to a town mode, when the vehicle is set to a country mode, when the vehicle is set to a light output mode in a specific weather (e.g., snow, rain, etc.), when the vehicle is set to a highway mode, and when the vehicle is set to an object tracking mode in which light is irradiated to a specific object, respectively. The processor 870 may control the shield 840 to vary a portion blocking light from passing through the shield 840 to form a different beam pattern depending on each mode (or preset condition) as illustrated in FIGS. 13A through 13F.

In addition, when it is sensed that another vehicle (i.e., an opposite vehicle) is traveling in a direction opposite to a direction in which the vehicle 100 is traveling, the processor 870 of the vehicle lamp of the present disclosure may control a light transmittance of at least a portion of the shield 840 to block light from passing through.

Figure 14C:
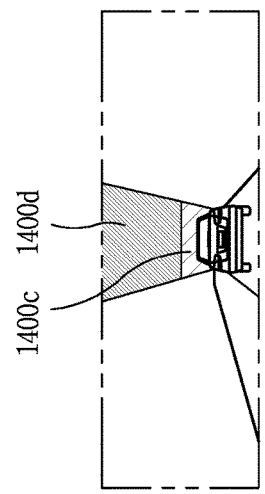
Figure 14C:
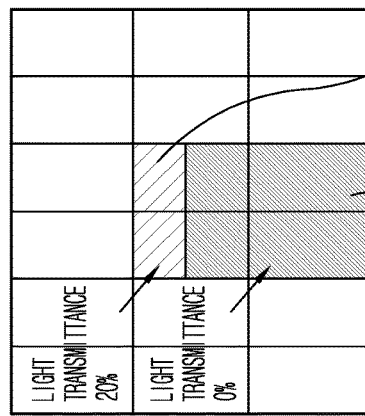
Figure 14B:
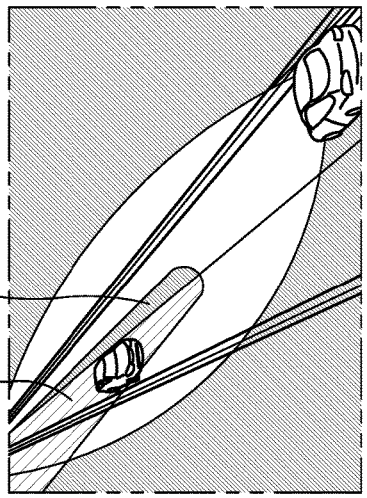
Figure 14B:
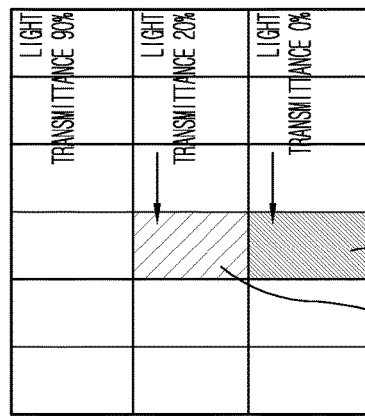
Figure 14A:
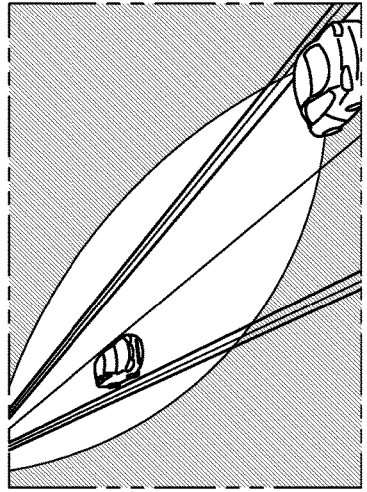
Figure 14A:
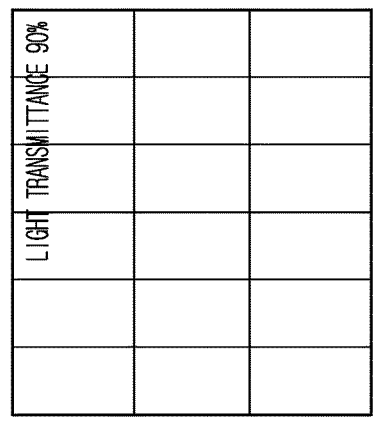

For example, referring to FIG. 14A, when the light transmittance of the shield 840 is set to output a first beam pattern, another vehicle traveling in an opposite direction may be sensed through the sensing unit 120. In this case, as illustrated in FIG. 14B, the processor 870 may control the light transmittance of at least portions 1410a, 1410b of a plurality of pixels of the shield 840 to block light from being transmitted to regions (space) 1400a, 1400b where light is projected to the other vehicle.

For example, the processor 870 may set the light transmittance of a portion 1410b corresponding to a first space to 0% to block light from being projected to the first space at which the driver of the another vehicle is located.

As another example, the processor 870 may set the light transmittance of a portion 1410a corresponding to a second space to a preset light transmittance of 20% to reduce an intensity, or brightness, of light being projected to the second space corresponding to the region surrounding the other vehicle.

Through such a configuration, the vehicle lamp of the present disclosure may implement an antiglare high-beam assist function for preventing light from being projected to an opposite vehicle.

In various situations, another vehicle may be travelling in the same direction as the vehicle 100. FIG. 14C illustrates an example of such a situation. Referring to FIG. 14C, the processor 870 may set the light transmittance of a portion 1410c corresponding to a space 1400c having a predetermined height to a preset light transmittance (e.g., 20%) to project light to both sides of the vehicle 100 and a space including the predetermined height, and not project light to the other space 1400d. For example, the processor 870 may set the light transmittance of the other portion 1410d corresponding to the other space 1400d to 0% to block light from projecting onto the other space 1400d.

Figure 15A:
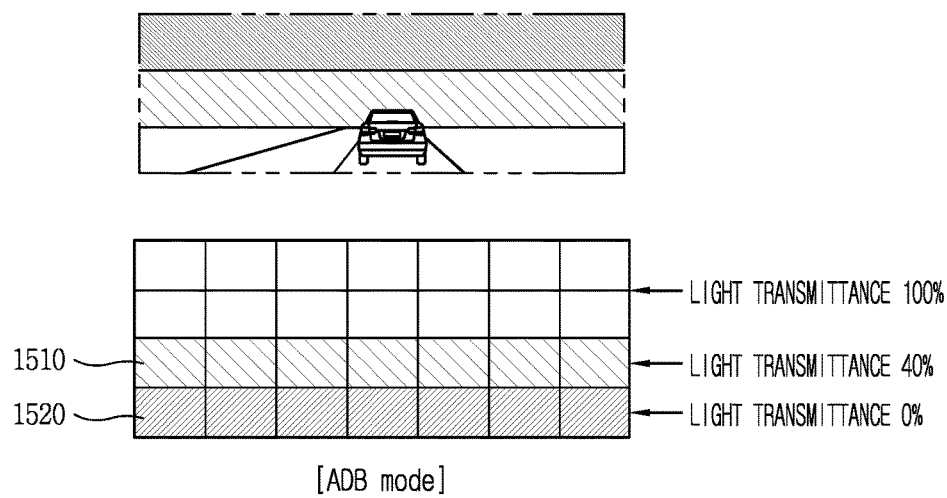
Figure 15B:
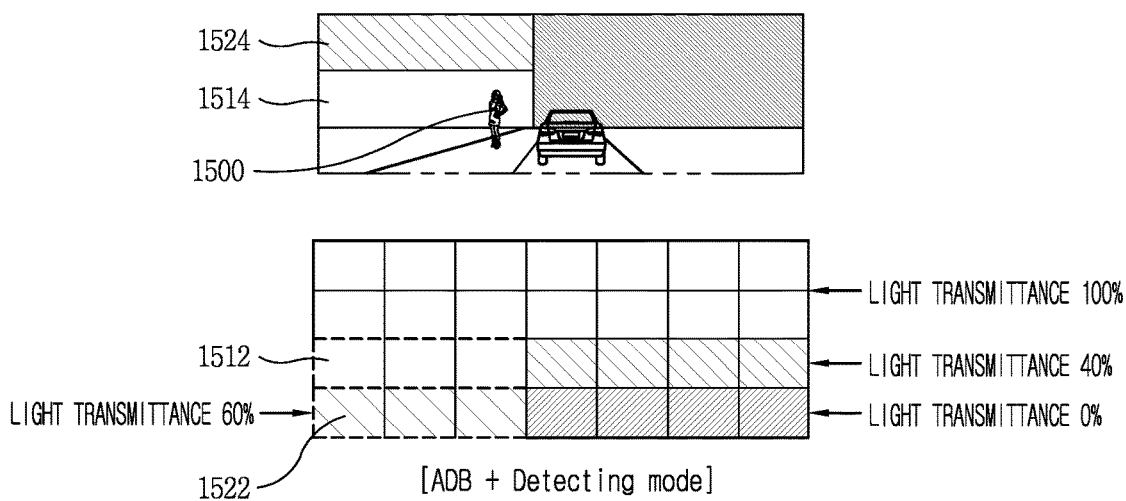

As another example, as illustrated in FIG. 15A, the processor 870 controls the light transmittance of a first and a second portions 1510, 1520 of the shield 840 to block at least part of light incident from the light source unit 810 in an example of a typical driving situation. For example, the light transmittance of pixels belonging to the first portion 1510 may be set to 40%, and the light transmittance of pixels belonging to the second portion 1520 may be set to 0%.

In this state, when a specific object (e.g., a person) is sensed within a predetermined distance from the vehicle 100 through the sensing unit 120, the processor 870 may control the light transmittance of the shield 840 to project light to a first region 1514 and a second region 1524 in space corresponding to the location of the specific object.

For example, the processor 870 may change the light transmittance of a sub portion 1512 allowing light projected to the first region 1514 to pass through based on the sensing of the specific object. For example, the light transmittance of the sub portion 1512 may be changed from 40% to 100% to project a large amount of light to the first region 1514. Here, the first region 1514 may be a space directly containing the sensed object.

Furthermore, the processor 870 may change the light transmittance of a sub portion 1522 allowing light projected to the second region 1524 to pass through among pixels belonging to the second portion 1520 based on the sensing of the specific object. For example, the light transmittance of the sub portion 1522 may be changed from 0% to 60% to project to the second region 1524 light of reduced intensity relative to the light projected to the first region 1514. Here, the first region 1514 in space may be a region surrounding the sensed object.

Through such a configuration, the vehicle lamp 800 of the present disclosure may not only output a beam pattern corresponding to an object sensing mode in an optimized manner, but also control an amount of light projected to a surrounding region as well as a space in which the sensed object is directly present, thereby implementing a precise beam pattern.

In some implementations, referring back to FIG. 11, the processor 870 of the present disclosure may set the light transmittance of an adjacent region (e.g., the first region 842a) adjacent both to a region of high light transmittance (e.g., 100%) and a region of low light transmittance (e.g., 0%, 20%) to a preset light transmittance.

For example, when the light transmittance of pixels included in a region adjacent to the first region 842a is set to 0% to block light from passing through, the processor 870 may set the light transmittance of pixels included in the first region 842a to a preset light transmittance (e.g., 50%).

Such control of the adjacent region (e.g., first region 842a) may provide a vehicle lamp configured to dim or smooth a cut-off line boundary when outputting a low-beam pattern. The described dimming when outputting a low-beam pattern may improve light coverage at an upper end portion of the cut-off line and improve visibility near the cut-off line.

In some situations, when a road surface is uneven and an excessive amount of light is projected to a lower end portion of the cut-off line, even a low-beam light may cause glare to the other vehicle traveling in an opposite direction. The dimming of a cut-off line boundary and reduction of an intensity of light around the cut-off line may thereby significantly reduce glare and potentially reduce accident rate.

In some implementations, the vehicle lamp 800 of the present disclosure may include a sensing unit 120 that senses information related to the vehicle.

The processor 870 may set the light transmittance of the adjacent region to the preset transmittance based on whether the sensed information related to the vehicle satisfies a preset condition.

Specifically, when the sensed information related to the vehicle corresponds to a first preset condition, the processor 870 may set the transmittance of the adjacent region to a first light transmittance (e.g., 80%). In addition, when the sensed information related to the vehicle corresponds to a second preset condition different from the first condition, the processor 870 may set the light transmittance of the adjacent region to a second light transmittance (e.g., 60%) different from the first light transmittance.

For example, the first preset condition may include a situation that requires or may benefit from a slight dimming of a boundary of the cut-off line of the low-beam pattern. Examples of the first preset condition may include a case where the surrounding brightness of the vehicle lamp 800 (or the vehicle 100) is higher than a reference brightness, a case where the vehicle 100 travels a specific road (e.g., a highway), a case where another vehicle traveling in an opposite direction is present within a predetermined distance from the vehicle 100, a case where the vehicle 100 is traveling on a downhill road, and the like.

For another example, the second preset condition may include a situation that requires or may benefit from a further dimming of the boundary of the cut-off line of the low-beam pattern. Examples of the second preset condition may include a case where the surrounding brightness of the vehicle lamp 800 (or the vehicle 100) is lower than a reference brightness, a case where the vehicle 100 travels a specific road (e.g., a dirt road, one-way road, etc.), a case where another vehicle traveling in an opposite direction is not present within a predetermined distance from the vehicle 100, a case where the vehicle 100 is traveling on a uphill road, and the like.

In addition to the foregoing examples, the first and second preset conditions may include various other conditions. Furthermore, the first and second conditions may be determined, added, or modified by user input.

In some implementations, when information related to the vehicle satisfying the preset conditions (e.g., first and second preset conditions) is not sensed through the sensing unit 120, the processor 870 may restore the light transmittance of the adjacent region to an original state (e.g., initial light transmittance).

For example, the light transmittance of a pixel included in a region (e.g., 842a in FIG. 11, 1200b in FIG. 12, or a region adjacent to a line 841 corresponding to a cut-off line) adjacent to a high light transmittance region and a low light transmittance region prior to satisfying a preset condition may be a first value (e.g., 0%). In this state, the light transmittance of the adjacent region 842a may be changed to a second value (e.g., 50%) different from the first value under the control of the processor 870 based on the sensing of information related to the vehicle satisfying a preset condition.

Then, when information related to the vehicle satisfying the preset condition is no longer sensed (e.g., information or a state related to the vehicle satisfying the preset condition is removed), the processor 870 may restore, or change, the light transmittance of the adjacent region 842a from the second value to the first value.

In some implementations, the processor 870 of the vehicle lamp 800 may set a portion disallowing light to pass through among a plurality of pixels of the shield 840 to generate a cut-off line at a different position with respect to the vehicle based on information related to the vehicle sensed through the sensing unit 120.

Specifically, when the sensed information related to the vehicle satisfies a first preset condition, the processor 870 may change the light transmittance of a first portion of the plurality of pixels to block light from passing through. In addition, when the sensed information related to the vehicle satisfies a second preset condition different from the first condition, the processor 870 may change the light transmittance of a second portion different from the first portion to allow light to pass through.

Figure 16A:
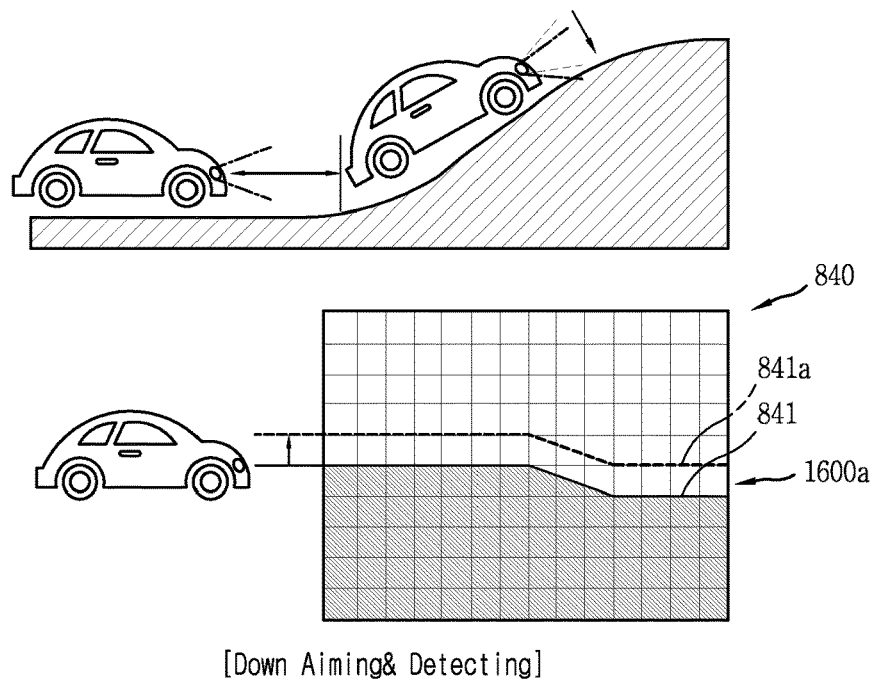

For example, referring to FIG. 16A, the first preset condition may include a case where the vehicle has entered an uphill road (or a case where a front surface of the vehicle body is inclined toward an upper side). In this case, the vehicle lamp 800 of the present disclosure may change the light transmittance of a first portion 1600a of a plurality of pixels of the shield 840 to block light from passing through so as to project a beam pattern toward the front of the vehicle in a downward direction with respect to the vehicle (i.e., a cut-off line of the beam pattern is lowered). As such, the processor 870 may change the light transmittance of a first portion 1600a of the plurality of pixels formed to allow light to pass through to block light from passing through based on the sensing of the first preset condition.

For example, during operation of the vehicle on a flat, non-inclined road, the processor 870 may control the light transmittance of a plurality of pixels such that a line corresponding to the cut-off line is present at a first position 841.

Then, when the processor 870 determines that the first preset condition is sensed through the sensing unit 120, the processor 870 may lower the cut-off line of the beam pattern output in a forward direction. Such lowering of the cut-off line is intended to adjust a light projection direction to a downward direction on an uphill road, thereby providing the driver with a more optimized beam pattern.

To this end, the processor 870 may control the light transmittance of the first portion 1600a of the plurality of pixels of the shield 840 (specifically, a region adjacent to a region controlled to block light from passing through in a region of a plurality of pixels adjusted to allow light to pass through) to lower the cut-off line of the beam pattern.

Figure 16B:
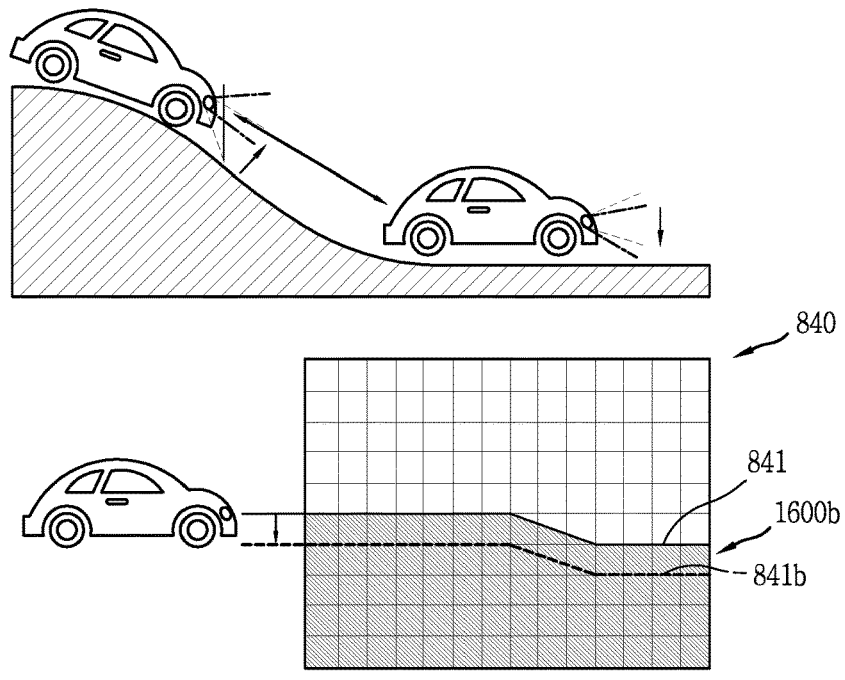

In case of FIGS. 16A-16B, a case is illustrated where reflected light is incident on the shield 840 from the light source unit 810, and a shape of the low-beam pattern is vertically inverted with respect to a region allowing light to pass through. As a result, as a region blocking light from passing through is enlarged toward the top side (or as a region allowing light to pass through decreases toward the top side or a line 841 corresponding to the cut-off line moves upward to a line 841a), the cut-off line of the low-beam pattern projected from the vehicle moves downward.

The second preset condition may include a case where the vehicle enters a downhill (or a case where a front surface of the vehicle body is inclined downward) as illustrated in FIG. 16B. In this case, the vehicle lamp 800 of the present disclosure may change the light transmittance of a second portion 1600b of the plurality of pixels of the shield 840 to project a beam pattern toward the front of the vehicle in an upward direction with respect to the vehicle 100. As such, the processor 870 may control the light transmittance of the second portion 1600b initially set to block light from passing through to allow light to pass through the second portion 1600b, based on a determination that the second preset condition is satisfied.

In some implementations, the processor 870 may control the light transmittance of a plurality of pixels to lower the line 841 corresponding to the cut-off line in a downward direction, to a line 841b.

In this case, as illustrated in FIGS. 16A-16B, a case is illustrated where reflected light is incident on the shield 840 from the light source unit 810, and a shape of the low-beam pattern is vertically inverted with respect to a region allowing light to pass through. As a result, as a region blocking light from passing through is reduced toward the bottom side (or as a region allowing light to pass through increases toward the bottom side) or a line 841 corresponding to the cut-off line moves downward to the line 841b, the cut-off line of the low-beam pattern moves upward.

Then, when the first preset condition or second condition is no longer sensed, the processor 870 may control the light transmittance of the plurality of pixels to restore the line 841 corresponding to the cut-off line to an original state.

Such control of the cut-off line may provide a vehicle lamp configured to change a position of the cut-off line in an optimized manner.

The present disclosure may form a low-beam pattern without having a separate shield for generating a cut-off line using the shield 840 in which a plurality of pixels are formed in a matrix shape to independently control the light transmittance in an individual manner. In addition, the present disclosure may control the light transmittance of a plurality of pixels included in the shield 840 to generate an optimized beam pattern according to the situation, thereby implementing a smart lamp.

Hereinafter, a vehicle lamp according to another implementation of the present disclosure will be described.

Figure 17:
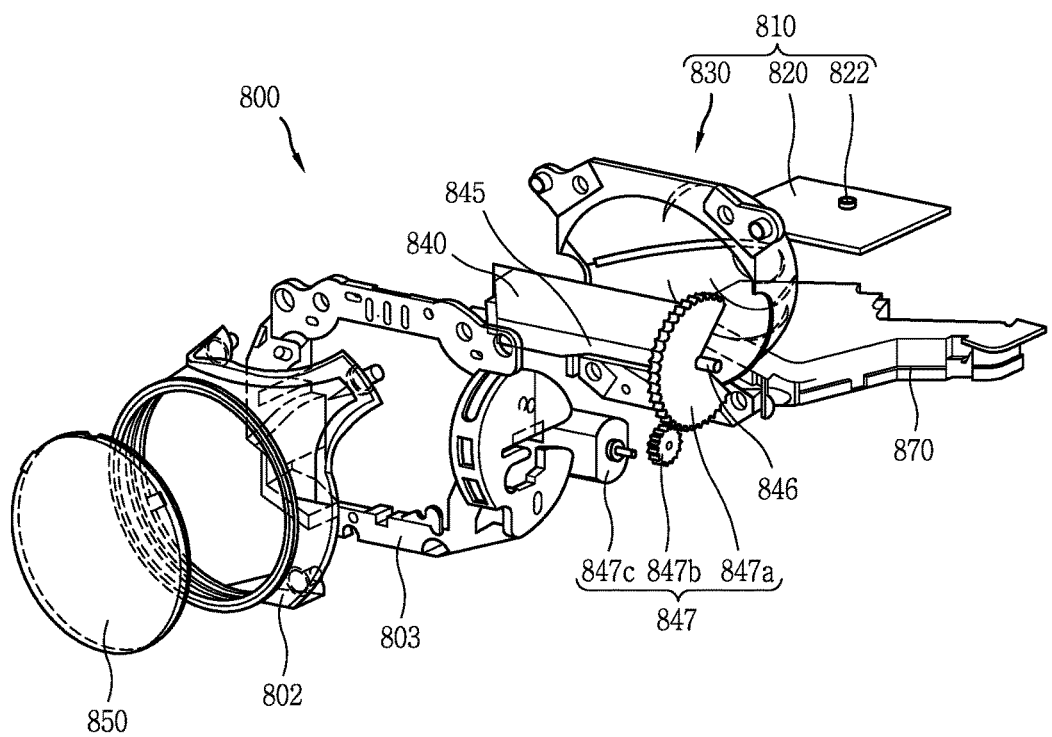
FIG. 17 is an exploded view illustrating another example of a vehicle lamp according to some implementations disclosed herein.

FIG. 17 illustrates an exploded view of another example of a vehicle lamp according to some implementations disclosed herein and FIGS. 18A-19B illustrate diagrams of the high-beam and low-beam operations of the vehicle lamp illustrated in FIG. 17.

Referring to FIG. 17, a vehicle lamp 800 according to some implementations of the present disclosure may include a light source unit 810 including at least one light source 822, a shield portion including a first shield 845 located forward of the light source unit 810 to form a shield pattern and a second shield 840 configured to change a light transmittance thereof to vary a beam pattern, a drive unit 847 configured to drive the shield portion, and at least one processor, such as a processor 870 configured to control at least one of the shield portion and the driver unit 847 when changing a beam pattern.

The drive unit 847 may be configured to drive a first shield 845 configured to form a predetermined beam pattern on the shield portion. The second shield 840 may be configured to change the light transmittance so as to vary the beam pattern.

The description of the lens 850, the first case 802, and the second case 803 is similar to their foregoing description in reference to FIG. 8.

The shield portion including the first shield 845 and the second shield 840 may be disposed between the light source unit 810 and the lens 850. For example, the shield portion 840 may be disposed between the light source unit 810 and the lens 850 to block at least a part of the light generated by the light source unit 810 and allow the remaining light to be pass through and reach the lens 850.

The first shield 845 may be configured and used for generating a cut-off line of a low-beam pattern without varying the light transmittance of the second shield 840. Here, the first shield 845 is a fixed-shape, fixed-transmittance type shield, and differs from the second shield 840 in that the light transmittance is not variable. The first shield 845 may be formed in various shapes.

When light output from the light source 822 is reflected by the reflector 830 and directed toward the first shield 845, a part of the light is blocked by the first shield 845. Then, the remaining light is received by the lens 850 and transmitted to the outside without being blocked by the first shield 845.

Through this, the present disclosure shields part of light by the first shield 845 and projects the remaining light to the outside. Here, since the first shield 845 is a shield having a fixed, non-modifiable, shape, it may consistently block the light at the same portion, and thus the present disclosure may output a fixed beam pattern (i.e., a fixed low-beam pattern).

The second shield 840 may be provided by the shield 840 illustrated in FIGS. 8 through 16. For example, the second shield 840 may include a plurality of pixels, and may be formed to independently control the light transmittance of each pixel.

In addition, the plurality of pixels may be arranged in a matrix form. Furthermore, each of the pixels may be formed to partially vary the light transmittance (e.g., in some implementations, the light transmittance of a first portion of each pixel has a first value, and the light transmittance of a second portion different from the first portion has a second value different from the first value).

The processor 870 of the present disclosure may independently, or individually, control the plurality of pixels included in the second shield 840. In addition, the processor 870 may individually control the plurality of pixels, to partially vary the light transmittance of each of the plurality of pixels (e.g., in some implementations, the light transmittance of a first portion of each pixel has a first value, and the light transmittance of a second portion different from the first portion has a second value different from the first value).

In some implementations, the shield portion may include a rotatable body 846. The body 846 formed to be rotatable may be formed in a shape of a cylindrical rod. For example, the body 846 may be inserted into a groove provided in the second case 803 and rotated by driving the drive unit.

Grooves on which the body 846 can be mounted may be provided on the second case 803. For example, a groove may be provided at a left or right side of the second case 803 relative to a reference plane that vertically crosses the center of the second case 803.

The body 846 may be inserted into the groove, and thus the body 846 may be positioned to cross the center of an inner space of the second case 803 in a width direction. Here, the width direction may be a horizontal direction or the width direction of the vehicle.

The rotatable body 846 may be coupled to the drive unit 847 configured to rotate the body 846 with respect to an axis passing through the body 846 along a length direction of the body 846 (e.g., the width direction as illustrated in FIG. 17).

The drive unit 847 may include a first gear 847a coupled to the body 846, a second gear 847b formed to be engaged with the first gear 847a, and an actuator 847c coupled to the second gear 847b and formed to rotate the second gear 847b as illustrated in FIG. 17.

FIG. 17 illustrates a structure in which the first gear 847a is rotated by the second gear 847b, but the present disclosure is not limited thereto. In some implementations, the drive unit of the present disclosure may be formed such that the actuator 847c is directly coupled to the first gear 847a to rotate the first gear 847a (i.e., the second gear 847b can be omitted).

The drive unit 847 may be driven under the control of the processor 870.

Furthermore, as illustrated in FIG. 17, the drive unit 847 may be disposed in an inner space of the second case 803, but may alternatively be disposed outside of the second case 803 or be integrally formed with the second case 803.

In some implementations, the shield portion may include a first shield 845 provided at a first side of the rotatable body 846 and a second shield 840 provided at the other side opposite to the first side.

Figure 18A:
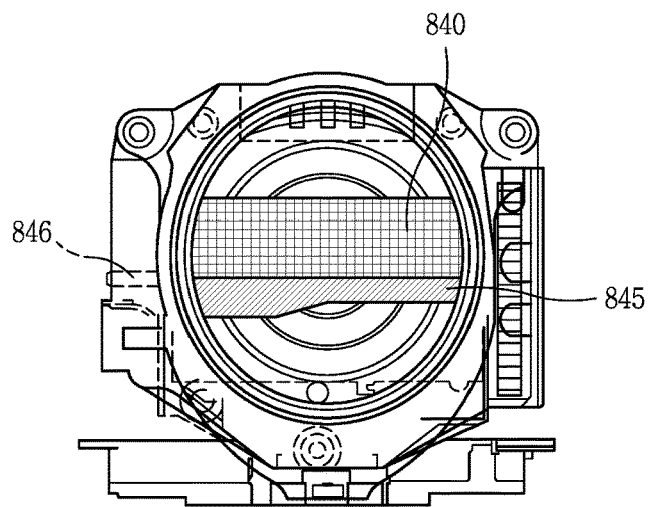
FIGS. 18A-19B are diagrams illustrating the high-beam and low-beam operations of the vehicle lamp illustrated in FIG. 17.

For example, referring to FIG. 18A, the first shield 845 and the second shield 840 may be disposed opposite to each other with respect to the rotatable body 846. In some implementations, the first shield 845 and the second shield 840 may be arranged at a 180 degree angle about the body 846. One side herein may be a lower surface of the body 846, and the other side may be an upper surface of the body 846, for an example.

In some implementations, the first shield 845 and the second shield 840 may be coupled to the first body and the second body, respectively, which are independently rotatable. In some implementations, the first body and the second body may be integrally formed. In some implementations, the first body and the second body may be disposed on different axes. For example, the first body and the second body may be spaced apart and arranged to be parallel to each other to provide the different axes of the first body and the second body. Then, the first shield 845 may be coupled to the first body, and the second shield 840 may be coupled to the second body.

Figure 18B:
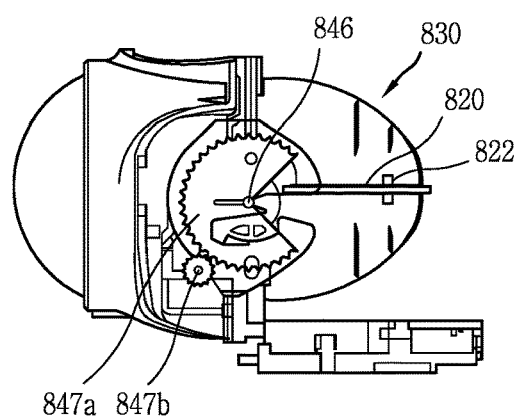

Referring to FIG. 18B, the processor 870 may control the drive unit 847 to rotate the body 846 on which the first shield 845 and the second shield 840 are mounted.

By rotating the body 846, the first shield 845 and the second shield 840 may be rotated with respect to the body 846.

Figure 18C:
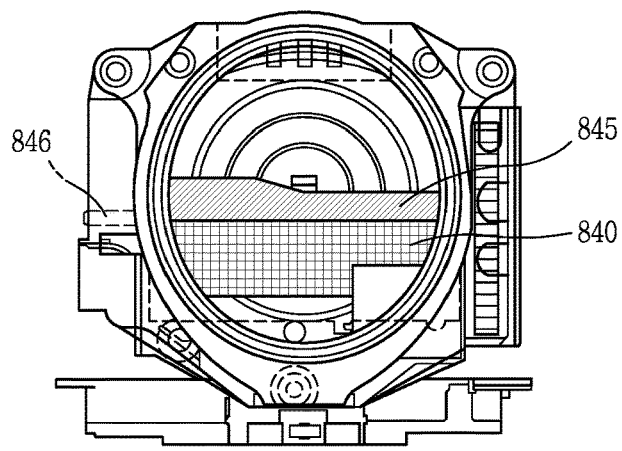

Accordingly, referring to FIG. 18C, the positions of the first shield 845 and the second shield 840 may be changed. For example, the relative orientation of the first shield 845 and the second shield 840 may be vertically inverted with respect to the configuration illustrated in FIG. 18A.

Figure 19A:
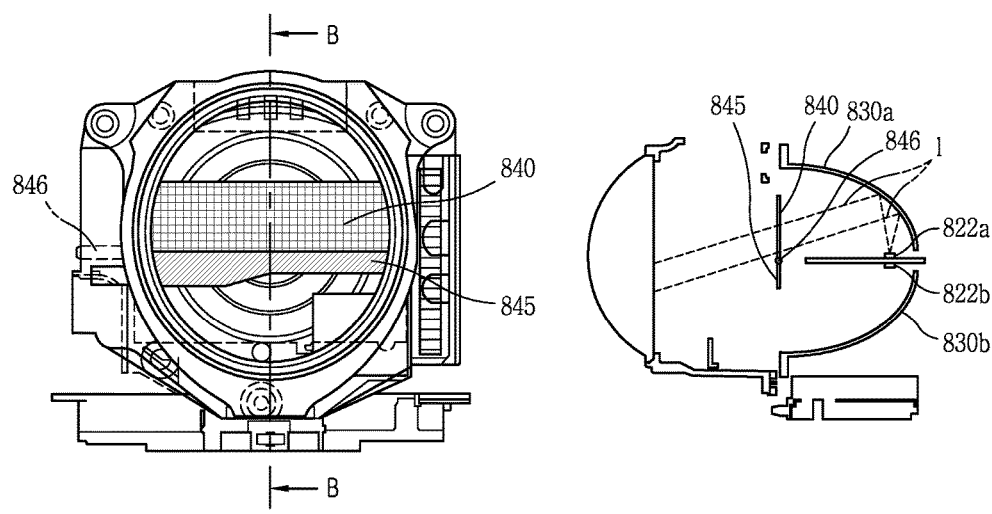

Referring to FIG. 19A, the light source unit 810 included in the vehicle lamp 800 of the present disclosure may include a first light source 822a that emits light in an upward direction, a second light source 822b that emits light in a downward direction, and a reflector 830 that reflects light output from the first and second light sources 822a, 822b in a forward direction (toward the shield portion or toward the lens 850).

As described above, light output from the first light source 822a formed to output light in an upward direction is reflected by an upper reflector (or a first reflector or an upper region of the reflector) 830a to travel in a forward downward direction. As a result, the first light source 822a and the upper reflector 830a may form a low-beam pattern.

Similarly, light output from the second light source 822b formed to output light in a downward direction is reflected by a lower reflector (or a second reflector or a lower region of the reflector) 830b to travel in a forward upward direction. As a result, the second light source 822b and the lower reflector may form a high-beam pattern.

In summary, light output from the first light source 822a may be reflected by the reflector 830 (upper reflector 830a), and then passed through the shield portion to form a low-beam pattern. Similarly, light output from the second light source 822*b* may be reflected by the reflector 830 (lower reflector 830*b*), and then passed through the shield portion to form a high-beam pattern.

At this time, light (l) output by the first light source 822*a* and reflected by the upper reflector (or an upper region of the reflector) may be directed (incident) along a path located above the body 846, or the center of the shield portion. In this configuration, the resulting projection direction of the light (l) may be a forward downward direction as illustrated in FIG. 19A.

Furthermore, light (h) output from the second light source 822*b* and reflected by the lower reflector (or a lower region of the reflector) may be directed along a path located below the body 846, or the center of the shield portion. At this time, the projection direction of the light (h) may be a forward upward direction as illustrated in FIG. 19B.

Figure 19B:
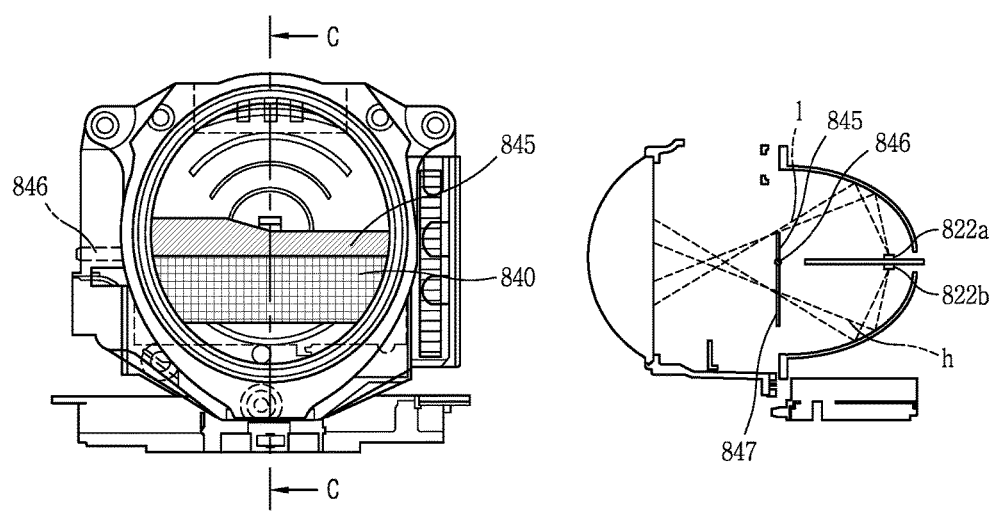

FIG. 19A illustrates a front view of the vehicle lamp 800 configured to output a low-beam and a cross-sectional view taken along line B-B when configured to output a low-beam, and FIG. 19B illustrates a front view illustrating the vehicle lamp 800 when configured to output a high-beam and a cross-sectional view taken along line B-B when configured to output a high-beam.

Referring to FIG. 19A, the processor 870 may control the drive unit 847 such that the first shield 845 is disposed at a lower side with respect to the rotatable body 846 and the second shield 840 is disposed at an upper side with respect to the body 846 when outputting a low-beam.

Accordingly, the light (l) output by the first light source 822*a* and reflected by the upper reflector 830*a* (or an upper region of the reflector) is incident on the second shield 840 of the shield portion (e.g., a matrix shield configured to vary the light transmittance thereof).

In some implementations, the processor 870 may control the light transmittance of at least part of the plurality of pixels included in the second shield 840 when outputting a low-beam to form a low-beam pattern.

For example, the processor 870 may set the light transmittance of at least part of the plurality of pixels (e.g., part of pixels forming the line 841 corresponding to a cut-off line) to 0% (or some value less than 100%) as illustrated in FIG. 11 to form a low-beam pattern having the cut-off line using the light (l) incident on the second shield 840.

In general, the processor 870 may control the light transmittance of at least part of the plurality of pixels included in the second shield 840 to form various low-beam patterns based on information related to the vehicle sensed through the sensing unit 120 as described in relation to FIGS. 8 through 17.

Furthermore, as illustrated in FIG. 19A, the second light source 822*b* is controlled by the processor 870 to not emit light when outputting a low-beam. In some implementations, since light generated by the second light source 822*b* forms a high-beam pattern, the processor 870 may turn off the second light source 822*b* when outputting a low-beam.

In some implementations, referring to FIG. 19B, when outputting a high-beam, the processor 870 may control the drive unit 847 such that the first shield 845 is disposed at an upper side of the rotatable body 846, and the second shield 840 is disposed at a lower side of the body 846.

When outputting a high-beam, the processor 870 may turn on both the first light source 822*a* and the second light source 822*b* or turn on only the second light source 822*b*.

When outputting a high-beam, the first shield 845 (e.g., fixed shield) may be disposed at an upper side with respect to the body 846, or the center of the shield portion, such that light (l) output by the first light source 822*a* and reflected by the upper reflector forms a predetermined beam pattern (low-beam pattern) having a cut-off line.

In addition, when outputting a high-beam, the second shield 840 (matrix shield) may be disposed at a lower side with respect to the body 846, or the center of the shield portion, such that light (h) output by the second light source 822*b* and reflected by the lower reflector forms various beam patterns (e.g., high-beam patterns). To this end, the processor 870 places the second shield 840 (matrix shield) below the body 846 to vary the high-beam pattern when outputting a high-beam.

Furthermore, when outputting a high-beam, the processor 870 may control the light transmittance of at least a part of the plurality of pixels included in the second shield 840 to vary a high-beam pattern, as described in relation to FIGS. 13A through 16B.

Through such a configuration, according to the present disclosure, the second shield 840 may be disposed in a path through which light (l) forming a low-beam pattern passes when outputting a low-beam, and the second shield 840 may be disposed in a path through which light (h) forming a high-beam pattern passes when outputting a high-beam, thereby providing a vehicle lamp configured to form various beam patterns.

Foregoing description of the vehicle lamp 800 described rotating or moving both the first shield 845 and the second shield 840, for example as a single object. However, in general, the first shield 845 and the second shield 840 may be moved in an independent manner.

FIGS. 20A-21B illustrate diagrams of various implementations of the vehicle lamp illustrated in FIG. 17.

In some implementations, the shield portion of the present disclosure may be formed in such a manner that the first shield 845 and the second shield 840 can rotate independently with respect to the rotatable body 846.

For example, the body 846 may include a rotatable first body and a rotatable second body. Furthermore, the drive unit 847 may include a first drive unit for rotating the first body and a second drive unit for rotating the second body.

The first shield 845 may be coupled to the first body, and the second shield 840 may be coupled to the second body.

The processor 870 may control the first drive unit of the drive unit to rotate the first shield 845 and the second drive unit of the drive unit to rotate the second shield 840.

Figure 20A:
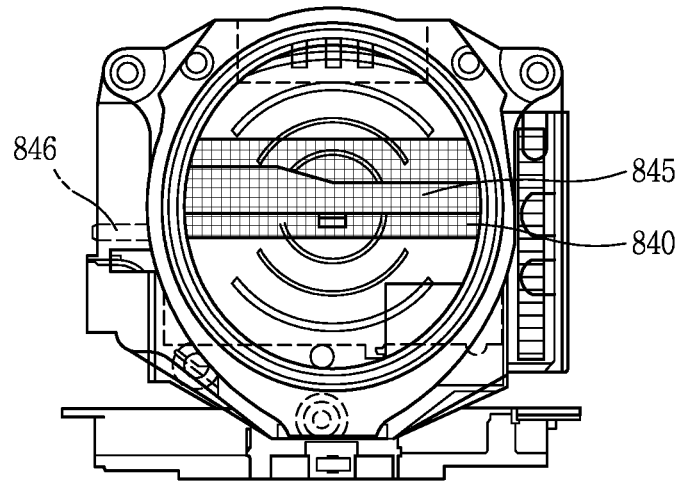
FIGS. 20A-21B are diagrams illustrating various implementations of the vehicle lamp illustrated in FIG. 17.
Figure 20B:
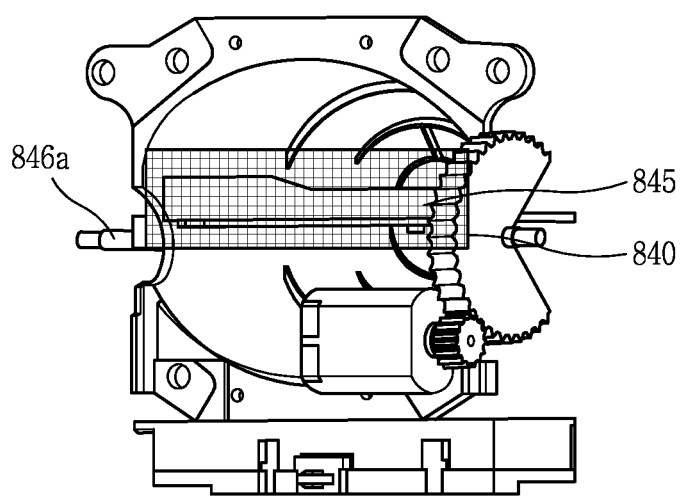

As illustrated in FIGS. 20A and 20B, the first shield 845 may be coupled to the first body 846 and disposed on an upper side thereof, and the second shield 840 may be coupled to the second body 846*a* and configured to be rotatable about the second body 846*a*.

In such a configuration, the processor 870, for example, may control the drive unit 847 to drive the shield portion such that the first shield 845 and the second shield 840 are positioned at an upper side with respect to the rotatable body 846 and oriented in an upward direction.

Figure 21A:
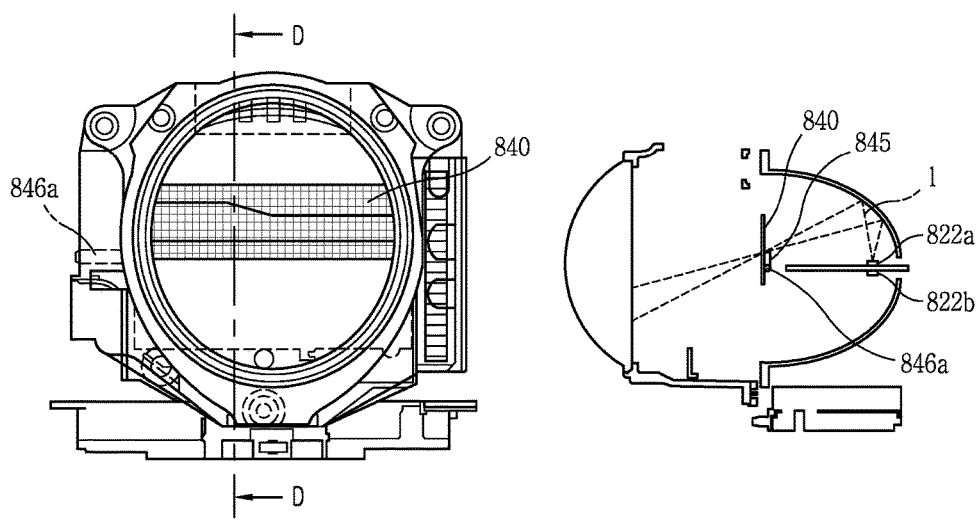
Figure 21B:
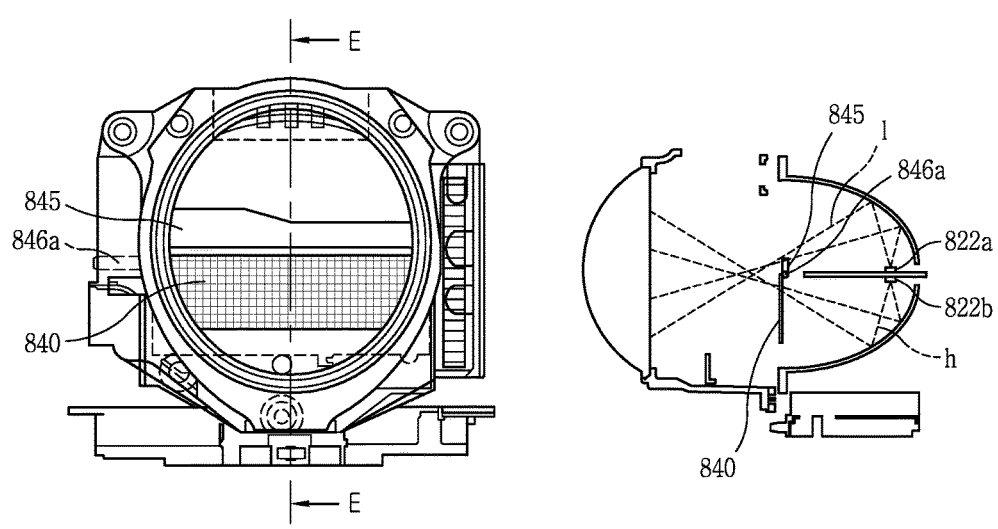

FIG. 21A illustrates a front view of the vehicle lamp 800 when configured to output a low-beam and a cross-sectional view taken along line D-D. FIG. 21B illustrates a front view of the vehicle lamp 800 configured to output a high-beam and a cross-sectional view taken along line E-E.

Referring to FIG. 21A, the processor 870 of the vehicle lamp may control the drive unit in such a manner that the first shield 845 (e.g., fixed shield) is disposed at an upper side with respect to the body 846*a*, and the second shield 840 (e.g., matrix shield) is disposed at an upper side with respect to the body 846*a* to overlap with the first shield 845.

In such a configuration, light (l) output by the first light source 822*a* and reflected by the upper reflector (or an upper region of the reflector) may be incident on the shield portion (i.e., an upper portion with respect to the body 846*a* or the center of the shield portion) in which the first shield 845 overlaps with the second shield 840.

In this configuration, a low-beam pattern formed when outputting a low-beam may include a cut-off line formed by the first shield 845, and an intensity of at least a part of the output light may be varied by the second shield 840 (e.g., matrix shield).

For example, the processor 870 may control the drive unit 847 such that the first shield 845 and the second shield 840 are disposed at an upper side with respect to the body 846*a* when outputting a low-beam.

Then, light (l) generated by the first light source 822*a* and reflected by the upper reflector may be partially blocked by the first shield 845 to form a cut-off line of the low-beam pattern. Furthermore, the processor 870 may control the light transmittance of at least part of the plurality of pixels of the second shield 840 to control an amount of light passing through the second shield 840 of the reflected light (l).

In this configuration, the processor 870 does not need to control the light transmittance (e.g., set to 0% or a low value) of a portion of the second shield 840 that overlaps with the first shield 845. Such is the case, as instead of controlling the light transmittance of at least part of the plurality of pixels in order to form a cut-off line of the low-beam pattern as done in the related art, the first shield 845 overlapping with the second shield 840 generates a cut-off line of the low-beam pattern. By use of such a configuration, the vehicle lamp 800 may be controlled to modify the low-beam pattern beyond the predetermined beam pattern of the first shield 845 and implement various beam patterns such as those shown in FIGS. 13A through 16B.

Accordingly, the first shield 845 (e.g., fixed shield) forming a predetermined beam pattern and the second shield 840 (e.g., matrix shield or display shield) varying a beam pattern may be disposed to overlap with each other along a path of light generated by the light source unit 810, thereby enabling more precise control over a low-beam pattern.

Furthermore, when outputting a low-beam, controlling the light transmittance of the pixels of the second shield 840 overlapping with the first shield 845 may not be required, thereby saving power consumption.

On the other hand, as illustrated in FIG. 21B, when outputting a high-beam, the processor 870 may control the shield portion such that the second shield disposed at an upper side to overlap with the first shield 845 as configured in FIG. 21A is now disposed at a lower side with respect to the body 846*a*.

For example, the processor 870 may control the second drive unit to drive the second body coupled to the second shield 840 in such a manner that the second shield 840 is moved to be disposed at a lower side with respect to the body 846*a*. The first shield 845 may be maintained at the upper side with respect to the body 846*a* to maintain a low-beam pattern. In this configuration, the light output by the second light source 822*b* and reflected by the lower reflector (or a lower region of the reflector) may be incident on the second shield 840 disposed at a lower side with respect to the body 846*a* when outputting a high-beam.

Then, the processor 870 may control the light transmittance of the second shield 840 disposed at a lower side of the body 846*a* to vary a high-beam pattern in various manners, e.g., as described in relation to FIGS. 13A through 16B.

On the other hand, a vehicle lamp according to some implementations of the present disclosure may provide a vehicle lamp configured to independently control light transmittances of pixels of a shield to change a beam pattern in various ways, and additionally provide a vehicle lamp configured to enhance an intensity of light projected in a low-beam pattern or enhancing an intensity of light projected in a high-beam pattern.

Figure 22:
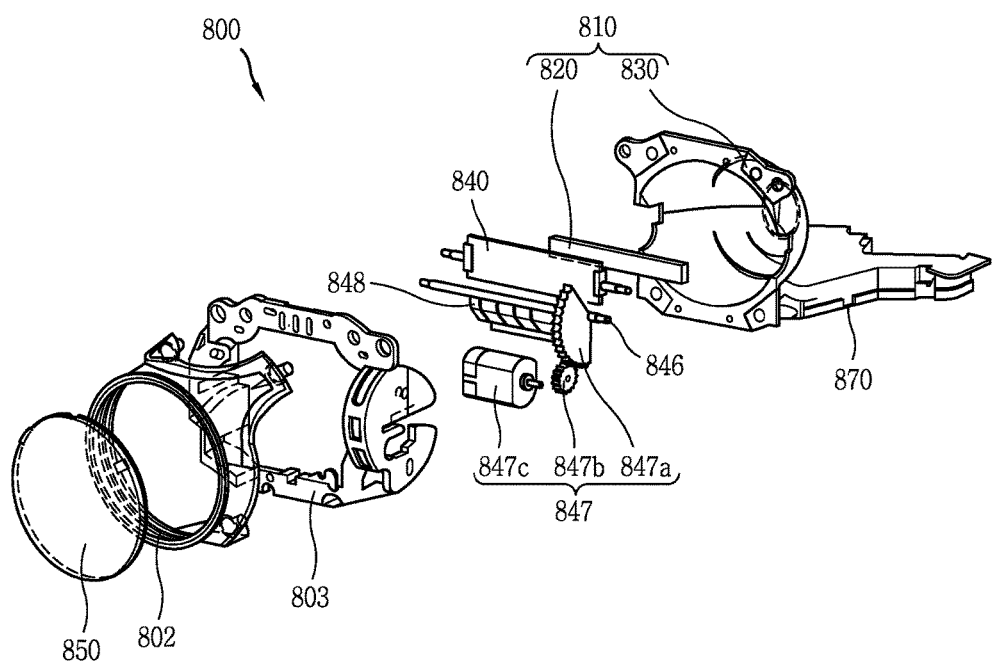
FIG. 22 is an exploded view illustrating an example of a vehicle lamp according to some implementations disclosed herein.

FIG. 22 illustrates an exploded view of an example of a vehicle lamp according to some implementations disclosed herein; and FIGS. 23A-24B illustrate high-beam and low-beam operations of the vehicle lamp illustrated in FIG. 22.

Referring to FIG. 22, a vehicle lamp 800 according to another implementation of the present disclosure may include an optical module 820 that includes at least one light source 822, a first reflector 830 configured to reflect light generated by the optical module 820, a shield 840 configured to block a part of the light reflected by the first reflector 830 to form a beam pattern, and a lens 850 configured to project the light transmitted by the shield (e.g., by not blocking) to the outside. Furthermore, the vehicle lamp 800 of the present disclosure may include a second reflector 848 configured to reflect the light reflected by the first reflector 830 back toward the first reflector 830 or reflect the light generated by the optical module 820 such that the light reaches the lens 850.

The optical module 820 may be configured to emit light in an upward, downward, or backward direction.

The first reflector 830 may be formed to reflect light emitted in an upward, downward or backward direction by the optical module 820 and project the light toward the front of the vehicle lamp 800 (e.g., toward the shield 840, toward the second reflector 848 or toward the lens 850).

For example, the optical module 820 may be centrally disposed at an interior space of the first reflector 830. In some implementations, the light source 822 may be disposed forward (e.g., further toward the lens 850) with respect to a rear end of the first reflector 830.

The shield 840 may be a matrix shield or display shield as described above. For example, the shield 840 may be the shield 840 as illustrated in FIGS. 8 through 16B. In some implementations, the shield 840 may include a plurality of pixels, and configured to independently control the light transmittance of each pixel.

In addition, the plurality of pixels may be arranged in a matrix form. Furthermore, each of the pixels may be formed to partially vary the light transmittance (e.g., in some implementations, the light transmittance of a first portion of each pixel has a first value, and the light transmittance of a second portion different from the first portion has a second value different from the first value).

The processor 870 may independently, or individually, control a plurality of pixels included in the shield 840. In addition, the processor 870 may control the plurality of pixels, respectively, to partially vary the light transmittance for each of the plurality of pixels (e.g., in some implementations, the light transmittance of a first portion of each pixel has a first value, and the light transmittance of a second portion different from the first portion has a second value different from the first value).

Referring back to FIG. 22, the light generated by the optical module 820, reflected by the first reflector 830, and then transmitted by the shield 840 (i.e., light not blocked by the shield 840) propagates through the lens 850 to form a predetermined beam pattern. For example, the shield 840 may be disposed forward of the optical module 820 and the first reflector 830 to form the predetermined beam pattern.

In some implementations, the vehicle lamp 800 may include a body 846 formed to be rotatable. For example, the body 846 may be an axial shaft that rotates around an axis passing lengthwise through the body 846. A second reflector 848 configured to reflect the light reflected by the first reflector 830 back toward the first reflector 830 may be coupled to the body 846.

As illustrated in FIG. 22, the body 846 formed to be rotatable may be formed in a shape of a cylindrical rod.

As illustrated in FIG. 17, the body 846 may be inserted into a groove provided in the second case 803 and rotated by driving the drive unit.

Grooves on which the body 846 can be mounted may be provided on the second case 803. For example, a groove may be provided at a left or right side of the second case 803 relative to a reference plane that vertically crosses the center of the second case 803.

The body 846 may be inserted into the groove, and thus the body 846 may be positioned to cross the center of an inner space of the second case 803 in a width direction. Here, the width direction may be a horizontal direction.

The rotatable body 846 may be coupled to the drive unit 847 configured to rotate the body 846 with respect to an axis passing through the body 846 along a length direction of the body 846 (e.g., the width direction as illustrated in FIG. 22).

The drive unit 847 may include a first gear 847*a* coupled to the body 846, a second gear 847*b* formed to be engaged with the first gear 847*a*, and an actuator 847*c* coupled to the second gear 847*b* and formed to rotate the second gear 847*b* as illustrated in FIG. 22.

FIG. 22 illustrates a structure in which the first gear 847*a* is rotated by the second gear 847*b*, but the present disclosure is not limited thereto. In some implementations, the drive unit of the present disclosure may be formed such that the actuator 847*c* is directly coupled to the first gear 847*a* to rotate the first gear 847*a* (i.e., the second gear 847*b* can be omitted).

The drive unit 847 may be driven under the control of the processor 870.

Furthermore, as illustrated in FIG. 22, the drive unit 847 may be disposed in an inner space of the second case 803, but may alternatively be disposed outside of the second case 803 or be integrally formed with the second case 803.

For example, the second reflector 848 may be coupled to the body 846. Then, the second reflector 848 may be rotated with respect to an axis passing through the body 846 along a length direction of the body 846 (e.g., the width direction as illustrated in FIG. 22). The processor 870 may control the drive unit 847 coupled to the body 846 to rotate the second reflector 848 with respect to the axis passing through the body 846.

In some implementations, the shield 840 may be coupled to an upper portion of the second case 803. For example, the shield 840 may be disposed to be in contact with an upward-facing surface or portion of the body 846.

However, the shield 840 and the body 846 may not be coupled to each other. In such scenarios, the shield 840 does not rotate when the body 846 is rotated with respect to its axis by the driving of the drive unit 847.

For example, the shield 840 and the second reflector 848 may be in contact with each other, but when the body 846 is rotated, the second reflector 848 rotates about an axis of the body 846, or the body 846, while the shield 840 remains stationary without rotating.

The description of the lens 850, the first case 802, and the second case 803 is similar to their foregoing description in reference to FIG. 8.

The lens 850 may be disposed forward of the shield 840 and the second reflector 848.

In some implementations, the first reflector 830 is disposed behind the optical module 820 at a predetermined distance from the optical module 820 to reflect light generated by the optical module 820 in a forward direction, a shield 840 is disposed forward of the first reflector 830 and the optical module 820, and a lens 850 is disposed forward of the shield 840.

In addition, the second reflector 848 may be provided below the shield 840 and formed to be rotatable with respect to an axis in contact with the shield 840. For example, the second reflector 848 may be formed to be rotatable about an axis (e.g., the body 846), and be disposed at different positions when outputting a low-beam and outputting a high-beam. To this end, the processor 870 may control the drive unit 847 for driving the body 846 coupled to the second reflector 848 such that the second reflector 848 is disposed at a different position when outputting a low-beam and outputting a high-beam, respectively.

In some implementations, the second reflector 848 may be disposed at a first position when outputting a low-beam and at a second position different from the first position when outputting a high-beam.

Figure 23A:
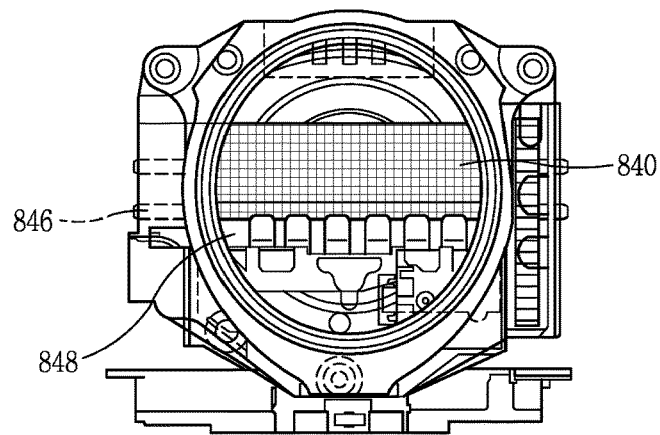
FIGS. 23A-24B are diagrams illustrating the high-beam and low-beam operations of the vehicle lamp illustrated in FIG. 22.

For example, referring to FIG. 23A, the processor 870 may control the drive unit such that the second reflector 848 is disposed at a lower side with respect to an axis (e.g., the body 846). In this case, from a front viewpoint of the vehicle lamp, a part of the first reflector 830 located at the lower side of the axis may be hidden by the second reflector 848. In this situation, when outputting a low-beam, the second reflector 848 may be visible below the one axis from the front viewpoint of the vehicle lamp.

Figure 23B:
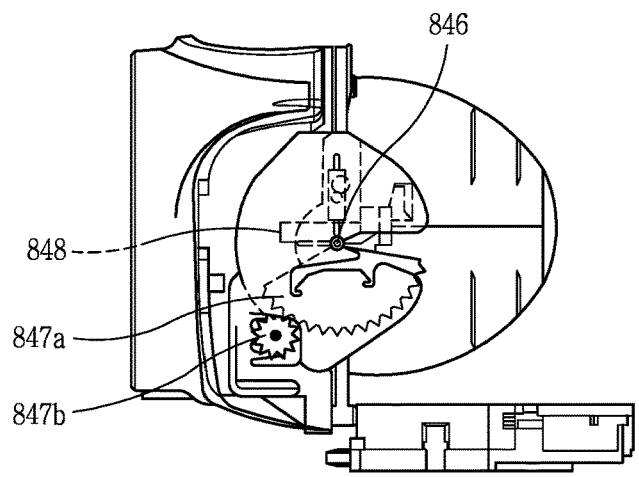

Referring to FIG. 23B, when outputting a high-beam, the processor 870 may control the drive unit 847 such that the second reflector 848 is oriented in a horizontal position with respect to the axis (e.g., the body 846).

Figure 23C:
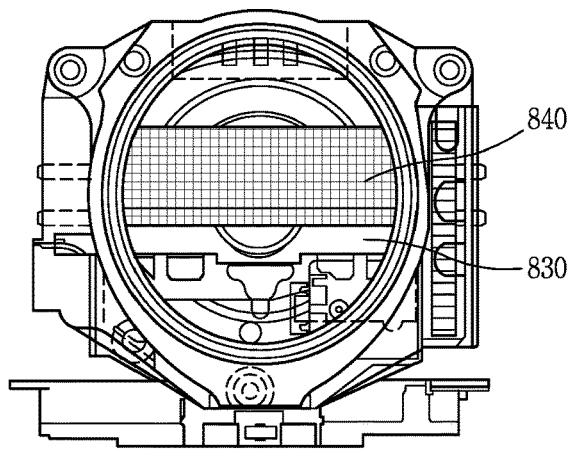

Referring to FIG. 23C, when the vehicle lamp is viewed from the front viewpoint of the vehicle lamp while configured as illustrated in FIG. 23B, the first reflector 830 may be visible below the axis. In contrast, at least a part of the second reflector 848 may not be visible from the front viewpoint as it is disposed at the second position (e.g., horizontal position with respect to the axis) different from the first position when outputting a high-beam.

Figure 24A:
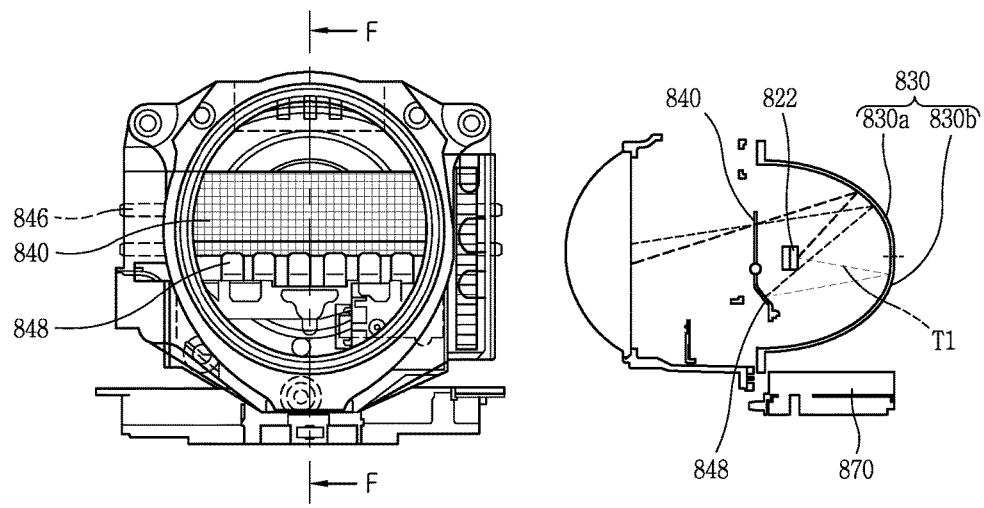
Figure 24B:
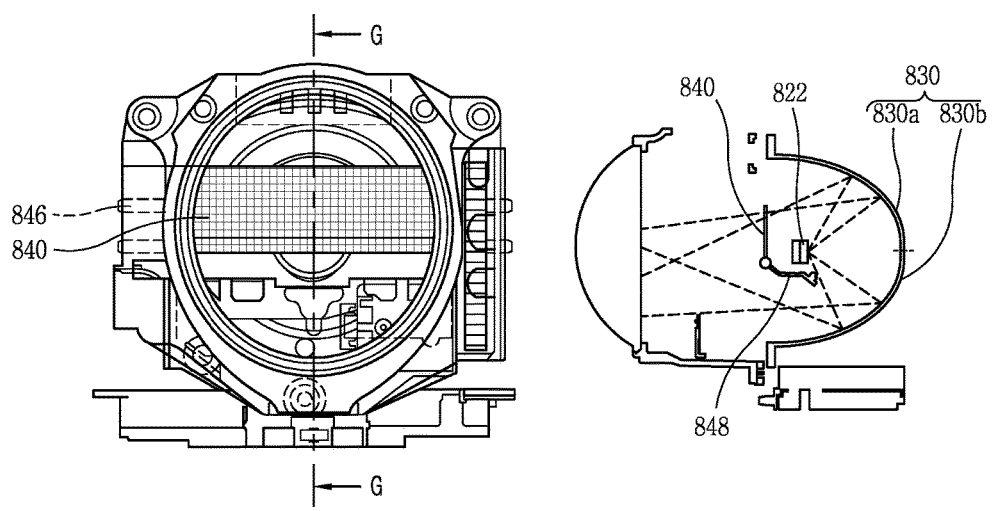

FIG. 24A illustrates a front view of a vehicle lamp when outputting a low-beam and a cross-sectional view taken along a line F-F, and FIG. 24B illustrates a front view of a vehicle lamp when outputting a high-beam and a cross-sectional view taken along a line G-G.

Referring to FIG. 24A, the second reflector 848 may be disposed at the first position (e.g., horizontal position with respect to the axis) when outputting a low-beam. The vehicle lamp of as illustrated in FIG. 24A may be provided with one light source 822, and the light source 822 may be formed to emit light toward a backward direction.

The first reflector 830 may reflect light generated by the light source 822 toward the front side of the vehicle lamp. For example, the light reflected by an upper region 830*a* of the first reflector 830 may be projected in a downward forward direction to form a low-beam pattern. In addition, light reflected by the lower region 830*b* of the first reflector 830 may be projected in an upward forward direction to form a high-beam pattern as shown in FIG. 24B.

The second reflector 848 may be disposed at a first position to reflect light reflected by the first reflector 830 (e.g., the lower region 830*b* of the first reflector 830) back toward the first reflector 830 when outputting a low-beam as illustrated in FIG. 24A.

An example of a path taken by light (T1) as it is reflected by the first reflector 830 and the second reflector 848 is shown. The light (T1) is first emitted by the light source 822 in a downward backward direction, and is then reflected by the first reflector 830 (e.g., the lower region 830b of the first reflector). Then, the light (T1) is directed in a downward forward direction toward the second reflector 848, which then reflects the light (T1) back toward the first reflector (e.g., the upper region 830a of the first reflector).

To this end, the processor 870 may control the drive unit 847 to move the second reflector 848 to the first position where light reflected from the lower region 830b of the first reflector is reflected back to the upper region 830a of the first reflector when outputting a low-beam.

Then, light reflected back to the first reflector (e.g., light reflected back to the upper region 830a of the first reflector) may pass through the shield 840 to enhance light with a low-beam pattern.

As such, the second reflector 848 is disposed at a lower side with respect to one axis (the body 846) to reflect light reflected from the lower region 830b of the first reflector back toward the upper region 830a of the first reflector, and accordingly, an intensity of light projected in a low-beam pattern may be enhanced.

In some implementations, the processor 870 may adjust the first position of the second reflector 848 to adjust a portion of the low-beam pattern where the intensity of light is enhanced.

In addition, the processor 870 may control the light transmittance of at least part of the plurality of pixels included in the shield 840 when outputting a low-beam, to form a low-beam pattern including a cut-off line and various low-beam patterns as illustrated in FIGS. 13A through 16B.

In some implementations, the second reflector 848 may have a concave shape as illustrated in FIGS. 24A and 24B to concentrate light reflected from the lower region 830b of the first reflector and reflect it back to the upper region 830a of the first reflector. Other examples of the shape of the second reflector 848 include a bent shape, and a curved shape.

Referring to FIG. 24B, when outputting a high-beam, the second reflector 848 may be disposed at a second position different from the first position such that the light reflected by the first reflector 830 does not see the second reflector 848.

For example, when outputting a high-beam, the processor 870 may control the second reflector 848 to be disposed at a second position different from the first position in such a manner that light reflected from the lower region 830b of the first reflector to the lens 850 propagates directly to the lens 850 without being reflected back by the second reflector 848.

For example, the second position may be a position at which the second reflector 848 does not fall on a path of the light generated by the light source 822 and reflected by the lower region 830b of the first reflector 830.

Through such a configuration, a low-beam and a high-beam may be provided using one light source.

On the other hand, a vehicle lamp related to the present disclosure may include a structure configured to enhance a low-beam as well as a high-beam.

Figure 25A:
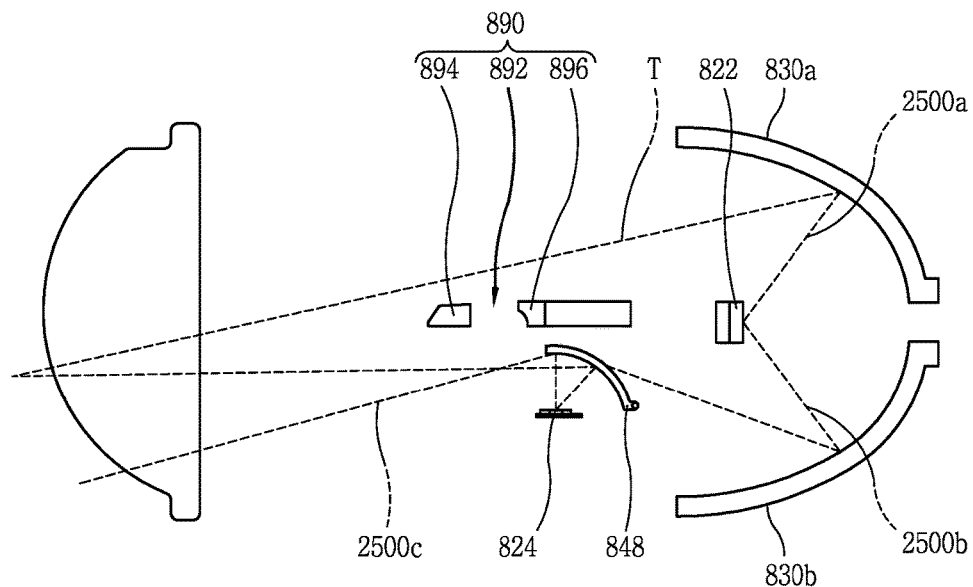
FIGS. 25A-25B are diagrams illustrating another implementation of the vehicle lamp illustrated in FIG. 22.
Figure 25B:
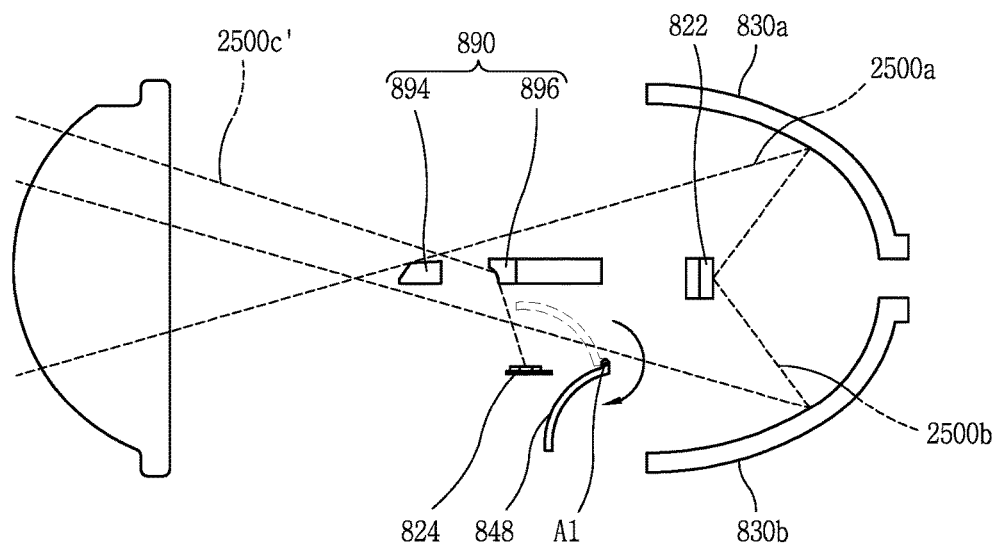

FIGS. 25A-25B illustrate diagrams of another implementation of the vehicle lamp illustrated in FIG. 22.

Referring to FIG. 25A, a light source included in the vehicle lamp may further include an auxiliary light source 824 disposed at a lower side of a shield 890. The auxiliary light source 824 may be, for example, a halogen light source, an LED light source, an LD light source or the like.

The shield 890 may be provided by the shield 840 formed to change the light transmittance described above, or by a physically fixed shield 845.

The light source 822 may be formed to emit light toward the first reflector 830 as described above.

Furthermore, the auxiliary light source 824 may be spaced apart from a lower side of the shield 890, and the second reflector 848 may be disposed adjacent to the auxiliary light source 824.

The second reflector 848 may be configured to rotate with respect to an axis (A1) (or a separate body formed along the axis (A1)) or rotationally move at a predetermined distance from the axis.

FIG. 25A is a cross-sectional view of the vehicle lamp when configured to output a low-beam, and FIG. 25B is a cross-sectional view of the vehicle lamp when configured to output a high-beam.

Light generated by the auxiliary light source 824 may be reflected toward the lens 850 by the second reflector 848 disposed at a first position as illustrated in FIG. 25A. The light generated by the auxiliary light source 824 may enhance the low-beam pattern.

Specifically, the auxiliary light source 824 may be disposed at a lower side of the shield 890 (i.e., below the shield 890), and formed to emit light toward the shield 890, (i.e., in an upward direction).

The second reflector 848 may be disposed at a first position to enhance an intensity of light of the low-beam pattern. At the first position, the light generated by the auxiliary light source 824 is directly directed toward a lower end portion of the lens 850. For example, the first position may correspond to a position of the second reflector 848 such that it falls between the auxiliary light source 824 and the shield 890.

In some implementations, the shield 890 may include a through hole 892 through which at least one of light reflected from the first reflector 830 (e.g., the lower portion 830b of the first reflector) or light generated by the auxiliary light source 824 is transmitted. Furthermore, light 2500b generated by the light source 822 and reflected by the first reflector 830 (e.g., the lower region 830b of the first reflector) may pass through the through hole 892 to form a high-beam pattern. Additionally, a reflective member 896 may be provided along at least a part of an interior region of the through hole 892.

Referring to FIG. 25B, when outputting a high-beam, the second reflector 848 may be disposed at a second position different from the first position such that light generated by the auxiliary light source 824 is incident on the reflective member 896. Furthermore, light 2500c' generated by the auxiliary light source 824 may be reflected by the reflective member 896 to enhance an intensity of light of the high-beam pattern.

For example, the second reflector 848 may be disposed at the second position when outputting a high-beam so that light 2500b reflected from the first reflector (specifically, the lower end region 830b of the first reflector) is not blocked by the second reflector 848, and is directed toward the through hole 892.

For example, the second position of the second reflector 848 for outputting a high-beam denotes a position where light generated by the light source 822, reflected by the lower region 830b of the reflector, and directed toward the through hole 892 of the shield 890 is not blocked. As another example, the second position where the second reflector 848 is located when outputting a high-beam may denote a position where light generated by the auxiliary light source 824 is not reflected or blocked by the second reflector 848, and directed toward the shield 890.

To this end, the processor 870 may control the drive unit 847 to move the second reflector 848 from the first position for outputting a low-beam to the second position different from the first position for outputting a high-beam.

Here, the second reflector 848 may be coupled to a separate body along the axis (A1) to rotate or rotationally move with respect to the axis (A1) passing through a length direction of the separate body.

The auxiliary light source may be independently turned on or off when outputting a high-beam. For example, the processor 870 may turn on or off the auxiliary light source 824 when outputting a high-beam.

The drive unit 847 may be formed to drive the separate body.

In some implementations, the second reflector 848 may be configured to perform a dual role as a reflector and a shield. When configured to output a low-beam, the second reflector 848 may be disposed at the first position as illustrated in FIG. 25A to block light 2500*b* reflected by the first reflector 830 (e.g., the lower region 830*b* of the first reflector) from reaching the through hole 892. The reflector 848 disposed at the first position reflects the light generated by the auxiliary light source 824 to enhance the low-beam pattern.

To this end, a reflective member may be formed on one surface (e.g., a surface facing the auxiliary light source 824) of the second reflector 848, and a reflective member may not be formed on the other surface opposite to the one surface of the second reflector 848 (e.g., a surface facing the light source 822).

According to the structure of FIGS. 25A and 25B, a cut-off line of the low-beam pattern may be formed by an end portion 894 of the shield 890. For example, the end portion 894 of the shield 890 may denote a part opposite to a portion provided with the reflective member 896 of the through hole 892. A portion of reflected light generated by the light source 822 and reflected by the upper region 830*a* of the first reflector is blocked by the end portion 894 of the shield 890 and the remaining portion is incident on the lens 850 through the shield 890. Through such a configuration, the present disclosure may form a low-beam pattern.

In summary, according to the vehicle lamp of the present disclosure, when outputting a low-beam, as illustrated in FIG. 25A, the second reflector 848 may be disposed at the first position to directly reflect light generated by the auxiliary light source 824 toward a lower end portion of the lens 850. Through this, an intensity of light of the low-beam pattern may be enhanced using the light generated by the auxiliary light source.

Furthermore, when the second reflector 848 is disposed at the first position as illustrated in FIG. 25A, light generated by the light source 822 and reflected by the lower region 830*b* of the first reflector is blocked by the second reflector 848 and thus not directed to the through hole 892 of the shield 890. Through this, formation of a high-beam pattern may be prevented when outputting a low-beam.

Furthermore, when the second reflector 848 is disposed at the first position as illustrated in FIG. 25A, light generated by the auxiliary light source 824 is not directed to the through hole 892 and reflective member 896 of the shield 890 located above the auxiliary light source 824, and thus a high-beam pattern is not formed.

Furthermore, for the vehicle lamp of the present disclosure, as illustrated in FIG. 25B, when outputting a high-beam, the second reflector 848 may be disposed at the second position to enable the light generated by the auxiliary light source 824 to be directly emitted toward the through hole 892 and reflective member 896 of the shield 890.

Furthermore, when the second reflector 848 is disposed at the second position as illustrated in FIG. 25B, the light generated by the light source 822 and reflected by the lower region 830*b* of the first reflector passes through the through hole 892 of the shield 890 without being blocked by the second reflector 848 to form a high-beam pattern.

Furthermore, when the second reflector 848 is disposed at the second position as illustrated in FIG. 25B, light emitted from the auxiliary light source 824 is not directly reflected toward the lens 850 by the second reflector 848, but reflected by the reflective member 896 formed on the through hole 892 of the shield 890 to enhance an intensity of light of the high-beam pattern.

FIGS. 26A-27B illustrate diagrams of yet another implementation of the vehicle lamp illustrated in FIG. 22.

Figure 26A:
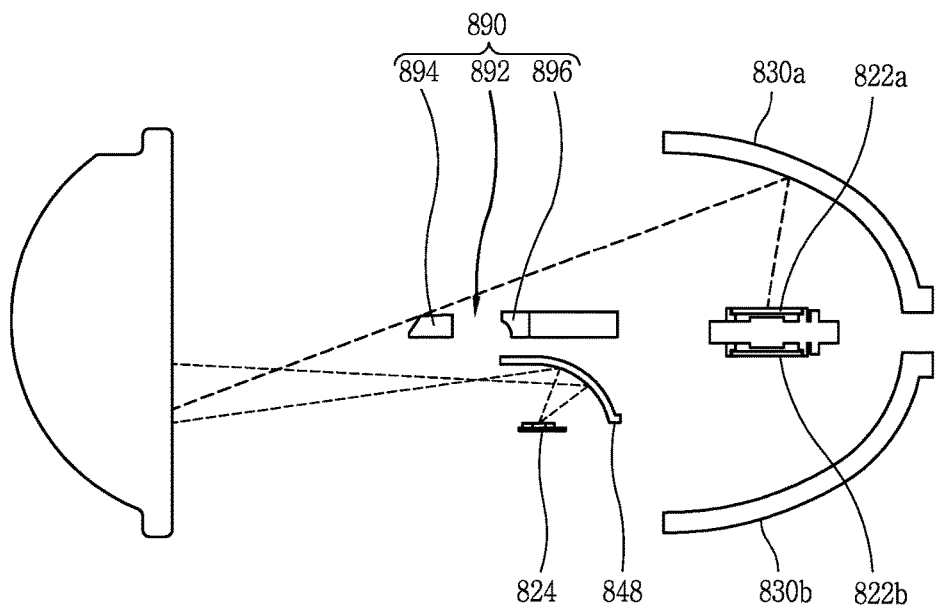
FIGS. 26A-27B are diagrams illustrating yet another implementation of the vehicle lamp illustrated in FIG. 22.
Figure 26B:
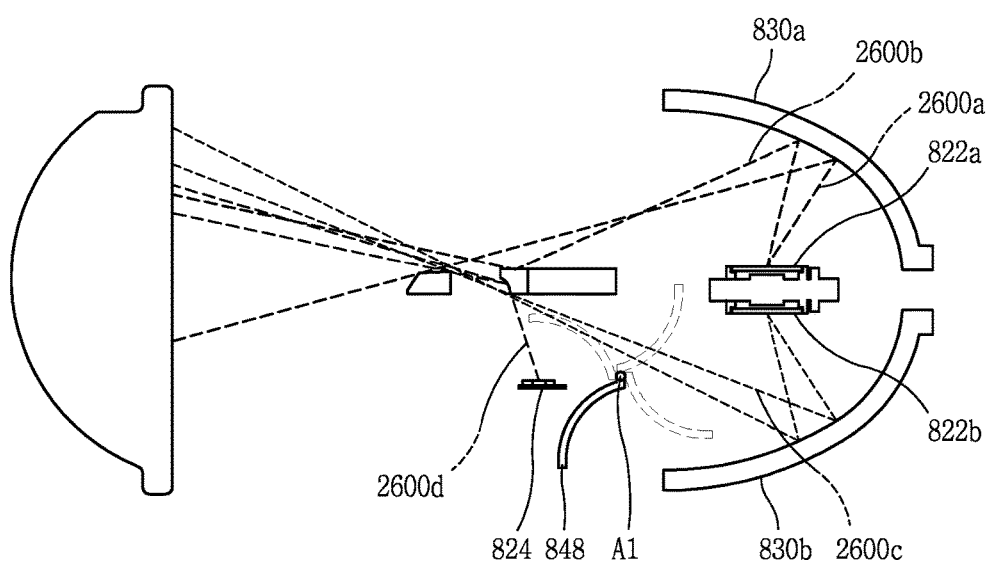

FIG. 26A is a cross-sectional view of a vehicle lamp when outputting a low-beam, and FIG. 26B is a cross-sectional view of a vehicle lamp when outputting a high-beam.

Referring to FIG. 26A, an optical module 820 of a vehicle lamp according to another implementation of the present disclosure may include a first light source 822*a* configured to output light in an upward direction, a second light source 822*b* configured to output light in a downward direction, and an auxiliary light source 824 disposed at a lower side of the shield 890. The shield 890 may include a through hole 892 through which light generated by the second light source 822*b* and reflected by the first reflector (specifically, the lower region 830*b* of the first reflector) passes.

The second light source 822*b* is controlled by the processor 870 to not emit light when outputting a low-beam, and emit light when outputting a high-beam. For example, since light generated by the second light source 822*b* forms a high-beam pattern, the processor 870 may turn off the second light source 822*b* when outputting a low-beam.

On the contrary, the processor 870 may turn on the second light source 822*b* when outputting a high-beam.

The processor 870 may turn on the first light source 822*a* when outputting a low-beam or a high-beam. Alternatively, the processor 870 may turn off the first light source 822*a* when outputting a high-beam.

The second reflector 848 may be disposed in various positions to vary the beam pattern.

For example, the second reflector 848 may be disposed at the first position to reflect light generated by the auxiliary light source 824 to be directly incident on a lower end portion of the lens 850 when outputting a low-beam.

As another example, referring to FIG. 26B, the second reflector 848 may be disposed at the second position to allow light generated by the auxiliary light source 824 and light 2600*c* generated by the second light source 822*b* and reflected by the first reflector (specifically, the lower region 830*b* of the first reflector) to pass toward the shield 890 when outputting a high-beam.

Furthermore, light 2600*c* generated by the second light source 822*b* and reflected by the first reflector (specifically, the lower region 830*b* of the first reflector 830) passes through the through hole 892 of the shield 890 to form a high-beam pattern.

As described above, a reflective member 896 may be provided along at least a part of an interior region of the through hole 892.

Light generated by the auxiliary light source 824 may be reflected by the reflective member 896 to enhance an intensity of light of a high-beam pattern.

To this end, when outputting a high-beam, as illustrated in FIG. 26B, the processor 870 may control the second reflector 848 to be disposed at the second position to allow light 2600c generated by the second light source 822b and reflected by the lower region 830b of the first reflector to pass through the through hole 892 of the shield 890. The light generated by the auxiliary light source 824 is incident on a reflective member 896 of the through hole 892 of the shield 890.

As an example, in FIGS. 26A and 26B, the second reflector 848 may be coupled to a rotating body (e.g., an axial shaft) along axis A1 to rotate about the axis A1. In such scenarios, the second reflector 848 may be coupled to, and rotated directly by, movement of the rotating body about axis A1.

Figure 27A:
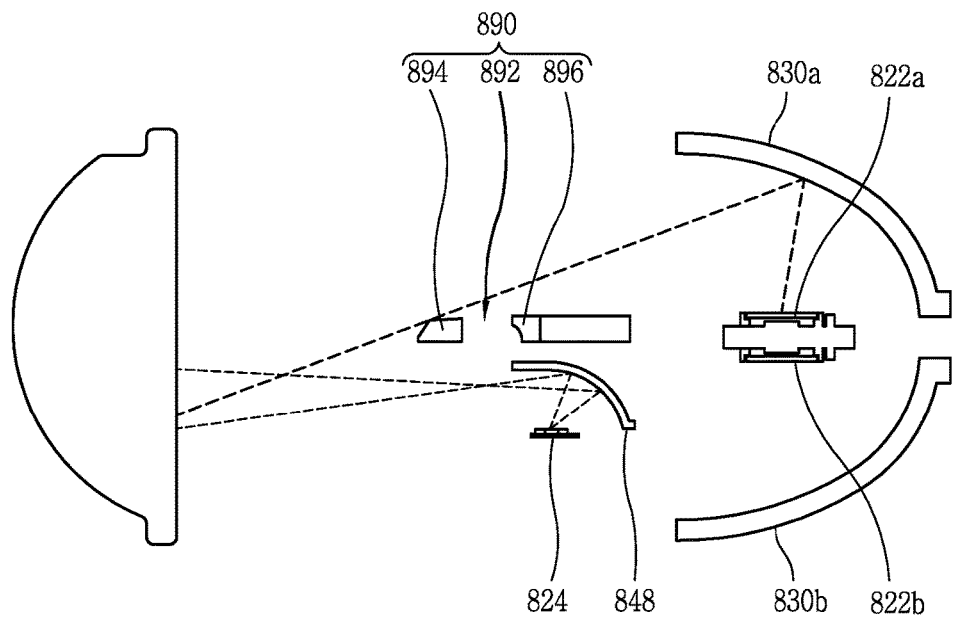
Figure 27B:
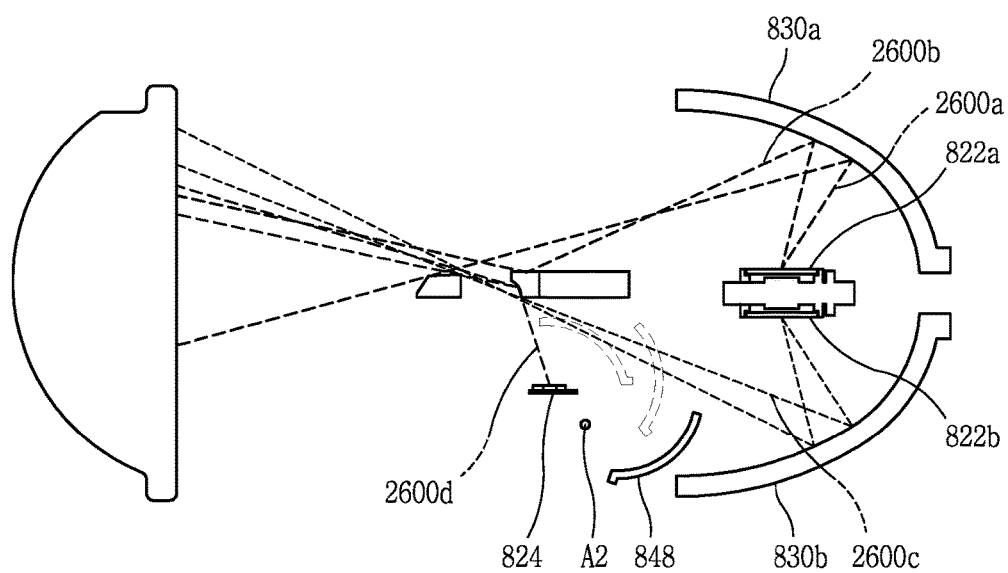

In some implementations, as shown in FIGS. 27A and 27B, the second reflector 848 may be spaced apart from an axis (e.g., axis A2) by a predetermined distance to rotationally move with respect to the axis A2. In such scenarios, the second reflector 848 is not directly coupled to a rotational body along axis A2, but nonetheless is controlled to by processor 870 to be oriented at different positions to effectively rotate about the axis A2.

Specifically, referring to FIGS. 27A and 27B, even when the second reflector 848 is spaced apart from an axis (A2) by a predetermined distance and configured to rotate about the axis (A2), the processor 870 may control the second reflector 848 to be disposed at a first position to directly reflect light generated by the auxiliary light source 824 to a lower end portion of the lens. The second reflector 848 disposed at the first position may also block the light generated by the second light source 822b and reflected by the lower region 830b of the first reflector from passing through the through hole 892 of the shield 890 when outputting a low-beam.

Furthermore, when outputting a high-beam, the processor 870 may control the second reflector 848 to be disposed at a second position different from the first position to direct light generated by the auxiliary light source 824 toward the through hole 892 and the reflective member 896 of the shield 890. The second reflector 848 disposed at the second position may also allow light generated by the second light source 822b to be reflected by the lower region 830b of the first reflector and pass through the through hole 892 of the shield 890.

Figure 28:
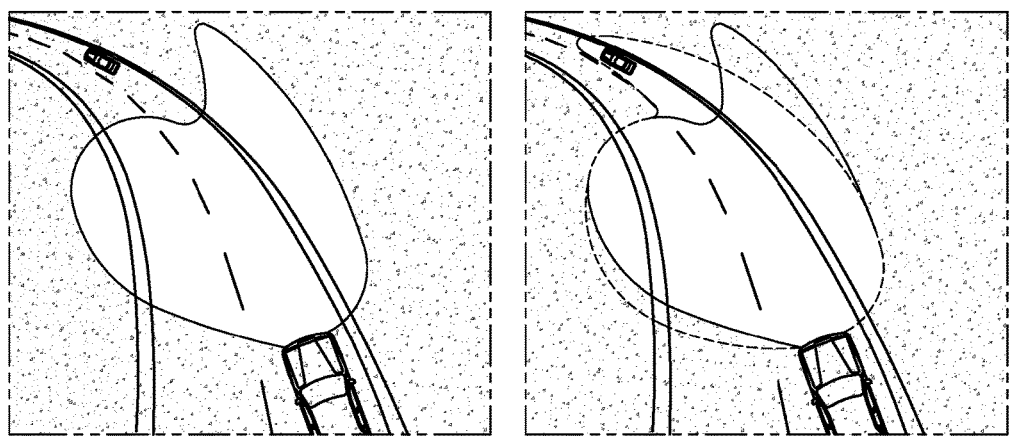
FIG. 28 is a diagram illustrating an example of an adaptive illumination provided by the vehicle lamp according to some implementations disclosed herein.

FIG. 28 illustrates a diagram of an example of an adaptive illumination provided by the vehicle lamp according to some implementations disclosed herein.

A vehicle lamp described in the present disclosure may output or project light in a forward direction to form a predetermined beam pattern. At this time, when a preset object to which light should be projected is sensed through the sensing unit 120 of the vehicle, the processor 870 may control the shield 840 to project light to the sensed object using the vehicle lamp 800.

The preset object denotes an object previously set to which light is adaptively projected based on the ADAS function of the vehicle. Examples of the preset object may include an object existing within a predetermined distance with respect to the present vehicle 100 (e.g., another vehicle, a person, an animal, a sign, a surrounding environment, a notice board, a traffic light, a line, etc.) or an object set to give attention to a driver. The preset object may be determined or varied based on control by the processor or user input.

The beam pattern of the light projected by the vehicle lamp 800 may be controlled in various ways based on the send object.

For example, the processor 870 may control the light transmittance of at least part of the plurality of pixels included in the shield 840 to project light to the sensed object based on the size and position of the sensed object.

As another example, when another vehicle traveling in a direction opposite to the direction in which the vehicle 100 is traveling is sensed, the processor 870 may control the light transmittance of the shield 840 not to project light to the another vehicle. To this end, when a vehicle traveling in an opposite direction is sensed, the processor 870 may reduce the light transmittance of a pixel corresponding to a region covering the sensed other vehicle such that light is not projected to the sensed other vehicle.

Through such a configuration, a vehicle lamp may implement an antiglare high-beam assist function that adaptively prevents light from being projected to an oncoming vehicle.

To this end, the vehicle 100 may include the vehicle lamp 800.

Furthermore, the operation or control method of the foregoing vehicle lamp 800 may be analogously applied to the operation or control method of the vehicle 100 (or controller 170) in the same or similar manner.

In addition, one or more or all functions, configurations, or control methods carried out by the processor 870 included in the vehicle lamp 800 may be carried out by the controller 170 provided in the vehicle 100. As such, one or more or all of the control methods described in this specification may be applied to a control method of a vehicle or a control method of a control apparatus.

The foregoing present disclosure may be implemented as codes readable by a computer on a medium written by the program. The computer-readable media may include all kinds of recording devices in which data readable by a computer system is stored. Examples of the computer-readable media may include ROM, RAM, CD-ROM, magnetic tape, floppy disk, and optical data storage device, and the like, and also include a device implemented in the form of a carrier wave (e.g., transmission via the Internet). In addition, the computer may include a processor or controller.

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A vehicle lamp, comprising:
   a light source unit comprising at least one light source configured to generate light;
   a lens that is arranged closer to a front of the vehicle lamp as compared to the light source unit, the lens configured to transmit the light generated by the light source unit; and
   a shield that is arranged between the light source unit and the lens, and configured to receive the light generated by the light source and allow at least a portion of the received light to pass therethrough,
   wherein the shield comprises a plurality of pixels having respective light transmittances that are configured to be variably controlled,
   wherein each of the plurality of pixels is configured to allow independent control of respective light transmittances, wherein the plurality of pixels of the shield are configured to define:
at least one first region having a first light transmittance for passing light therethrough,
at least one second region having a second light transmittance for blocking light, and
at least one intermediate region having a preset light transmittance between the first light transmittance and the second light transmittance.

2. The vehicle lamp of claim 1, wherein the plurality of pixels are arranged on the shield in a matrix form.

3. The vehicle lamp of claim 1, wherein each of the plurality of pixels of the shield is configured to provide a variably controlled amount of light transmittance therethrough.

4. The vehicle lamp of claim 3, wherein for each pixel, a light transmittance of a first sub portion of the pixel is controllable to be different from a second sub portion of the pixel.

5. The vehicle lamp of claim 1, further comprising at least one processor configured to control a light transmittance of the shield.

6. The vehicle lamp of claim 5, wherein the at least one processor is configured to:
control a portion of the plurality of pixels of the shield to selectively block light from passing therethrough to form a beam pattern having a cut-off line.

7. The vehicle lamp of claim 6, wherein the at least one processor is configured to:
determine whether the light received by the shield is a direct light or a reflected light; and
based on a result of the determination of whether the light received by the shield is a direct light or a reflected light, control a portion of the plurality of pixels of the shield to selectively block light from passing therethrough.

8. The vehicle lamp of claim 7, wherein the at least one processor is configured to:
based on a determination that the light received by the shield is a reflected light, control the pixels of a first portion of the plurality of pixels to selectively block light from passing therethrough; and
based on a determination that the light received by the shield is a direct light, control the pixels of a second portion different from the first portion of the plurality of pixels to selectively block light from passing therethrough.

9. The vehicle lamp of claim 6, wherein:
the plurality of pixels of the shield are configured to form at least one high light transmittance region, at least one low light transmittance region, and at least one adjacent region adjacent to both the high light transmittance region and the low light transmittance region, and
the at least one processor is configured to set a light transmittance of the at least one adjacent region to a preset light transmittance.

10. The vehicle lamp of claim 9, further comprising:
a sensing unit configured to sense information related to a vehicle including the vehicle lamp,
wherein the at least one processor is configured to set the light transmittance of the at least one adjacent region to the preset light transmittance by:
determining that the sensed information related to the vehicle satisfies a preset condition; and
based on a determination that the sensed information related to the vehicle satisfies the preset condition, setting the light transmittance of the at least one adjacent region to the preset light transmittance.

11. The vehicle lamp of claim 10, wherein:
the preset condition comprises a first preset condition and a second preset condition different from the first preset condition, and
the at least one processor is configured to set the light transmittance of the at least one adjacent region to the preset light transmittance by:
determining whether the sensed information related to the vehicle satisfies the first preset condition or the second preset condition;
based on a determination that the sensed information related to the vehicle satisfies the first preset condition, setting the light transmittance of the at least one adjacent region to a first preset light transmittance; and
based on a determination that the sensed information related to the vehicle satisfies the second preset condition, setting the light transmittance of the at least one adjacent region to a second preset light transmittance different from the first preset light transmittance.

12. The vehicle lamp of claim 11, wherein:
the preset first light transmittance is greater than the second preset light transmittance,
the first preset condition comprises any one of a surrounding brightness of the vehicle being higher than a reference brightness, the vehicle traveling on a highway, a presence of another vehicle traveling in an opposite direction within a predetermined distance from the vehicle, or the vehicle traveling on a downhill road, and
the preset second condition comprises any one of the surrounding brightness of the vehicle being lower than the reference brightness, the vehicle traveling on a dirt road or a one-way road, an absence of another vehicle traveling in an opposite direction within the predetermined distance from the vehicle, or the vehicle traveling on a uphill road.

13. The vehicle lamp of claim 10, wherein the at least one processor is further configured to:
determine that the information related to the vehicle satisfying the preset condition is not sensed through the sensing unit; and
based on a determination that the information related to the vehicle satisfying the preset condition is not sensed through the sensing unit, restore the light transmittance of the at least one adjacent region to an original light transmittance.

14. The vehicle lamp of claim 6, further comprising:
a sensing unit configured to sense information related to a vehicle including the vehicle lamp,
wherein the at least one processor is configured to:
based on the sensed information related to the vehicle, control a portion of the plurality of pixels of the shield that blocks light from passing therethrough to vary a position of the cut-off line of the beam pattern with respect to the vehicle.

15. The vehicle lamp of claim 14, wherein the at least one processor is configured to:
determine whether the sensed information related to the vehicle satisfies a first preset condition or a second preset condition;
based on a determination that the sensed information related to the vehicle satisfies the first preset condition, modify a light transmittance of a first portion of the plurality of pixels of the shield to block light from passing therethrough; and based on a determination that the sensed information related to the vehicle satisfies the second preset condition, modify a light transmittance of a second portion of the plurality of pixels different from the first portion to allow light to pass therethrough.

16. The vehicle lamp of claim 15, wherein:
the first preset condition includes the vehicle being oriented on an incline and the second preset condition includes the vehicle being oriented on a decline,
the light received by the shield is a reflected light,
the modifying of the light transmittance of the first portion of the plurality of pixels of the shield moves the cut-off line of the beam pattern in a upward direction, and
the modifying of the light transmittance of the second portion of the plurality of pixels of the shield moves the cut-off line of the beam pattern in a downward direction.

17. The vehicle lamp of claim 6, wherein the at least one processor is configured to:
determine that a high-beam output request is received; and
based on a determination that a high-beam output request is received, control at least a part of the portion of the plurality of pixels of the shield that is configured to block light from passing therethrough to allow light to pass through.

18. A vehicle, comprising:
a plurality of wheels;
a power source configured to drive at least one of the plurality of wheels; and
a vehicle lamp comprising:
    a light source unit comprising at least one light source configured to generate light,
    a lens that is arranged closer to a front of the vehicle lamp as compared to the light source unit, the lens configured to transmit the light generated by the light source unit, and
    a shield that is arranged between the light source unit and the lens, and configured to receive the light generated by the light source and allow at least a portion of the received light to pass therethrough,
wherein the shield comprises a plurality of pixels having respective light transmittances that are configured to be variably controlled,
wherein each of the plurality of pixels is configured to allow independent control of respective light transmittances,
wherein the plurality of pixels of the shield are configured to define:
    at least one first region having a first light transmittance for passing light therethrough,
    at least one second region having a second light transmittance for blocking light, and
    at least one intermediate region having a preset light transmittance between the first light transmittance and the second light transmittance.

* * * * *